United States Patent
Toba et al.

(10) Patent No.: US 11,245,955 B2
(45) Date of Patent: Feb. 8, 2022

(54) TRANSMISSION CONTROL DEVICE, TRANSMISSION CONTROL METHOD, RECEPTION CONTROL DEVICE, RECEPTION CONTROL METHOD, AND SIGNAL TRANSMISSION SYSTEM

(71) Applicant: SONY CORPORATION, Tokyo (JP)

(72) Inventors: Kazuaki Toba, Kanagawa (JP); Masanari Yamamoto, Kanagawa (JP); Hiroshi Morita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,861

(22) PCT Filed: Oct. 29, 2018

(86) PCT No.: PCT/JP2018/040077
§ 371 (c)(1),
(2) Date: Jun. 8, 2020

(87) PCT Pub. No.: WO2019/123837
PCT Pub. Date: Jun. 27, 2019

(65) Prior Publication Data
US 2020/0374580 A1    Nov. 26, 2020

(30) Foreign Application Priority Data

Dec. 21, 2017  (JP) .............................. JP2017-245002

(51) Int. Cl.
*H04N 21/436* (2011.01)
*H04N 21/442* (2011.01)

(52) U.S. Cl.
CPC ......... *H04N 21/436* (2013.01); *H04N 21/442* (2013.01)

(58) Field of Classification Search
None
See application file for complete search history.

(56) References Cited

U.S. PATENT DOCUMENTS

2009/0047908 A1    2/2009  Freundlich et al.
2009/0193482 A1*   7/2009  White ................ H04N 21/6338
                                                      725/110
(Continued)

FOREIGN PATENT DOCUMENTS

CN        101535922 A    9/2009
CN        101668137 A    3/2010
(Continued)

OTHER PUBLICATIONS

International Search Report and Written Opinion of PCT Application No. PCT/JP2018/040077, dated Dec. 18, 2018, 09 pages of ISRWO.

*Primary Examiner* — Justin E Shepard
(74) *Attorney, Agent, or Firm* — Chip Law Group

(57) ABSTRACT

In a case where a main stream and a control signal are transmitted in parallel between two devices, transmission of the main stream is continued without interruption of the transmission of the main stream even in a case where communication quality of the control signal is deteriorated. Provided is a transmission control device including an information acquisition unit configured to acquire a channel change request transmitted from a reception device in a case where communication quality of a control signal transmitted through a first channel and received by the reception device being poorer than first quality has been detected, and a transmission control unit configured to start transmission of the control signal to the reception device through a second channel different from the first channel in a case where the channel change request has been acquired, in which the transmission control unit stops transmission of the control signal through the first channel in a case where a predetermined condition has been satisfied since the start of transmission of the control signal through the second channel.

20 Claims, 12 Drawing Sheets

(56) References Cited

U.S. PATENT DOCUMENTS

| | | | |
|---|---|---|---|
| 2010/0060801 A1 | 3/2010 | Kimura | |
| 2010/0118188 A1 | 5/2010 | Nakajima et al. | |
| 2012/0309397 A1* | 12/2012 | Rao | H04W 36/30 455/437 |
| 2018/0041268 A1* | 2/2018 | Prillard | H04B 7/212 |

FOREIGN PATENT DOCUMENTS

| | | |
|---|---|---|
| EP | 2063643 A1 | 5/2009 |
| EP | 2161927 A2 | 3/2010 |
| JP | 2010-062968 A | 3/2010 |
| JP | 2013-51703 A | 3/2013 |
| KR | 10-2009-0079879 A | 7/2009 |
| WO | 2008/056686 A1 | 5/2008 |
| WO | 2009/022334 A2 | 2/2009 |
| WO | 2017/163529 A1 | 9/2017 |

\* cited by examiner

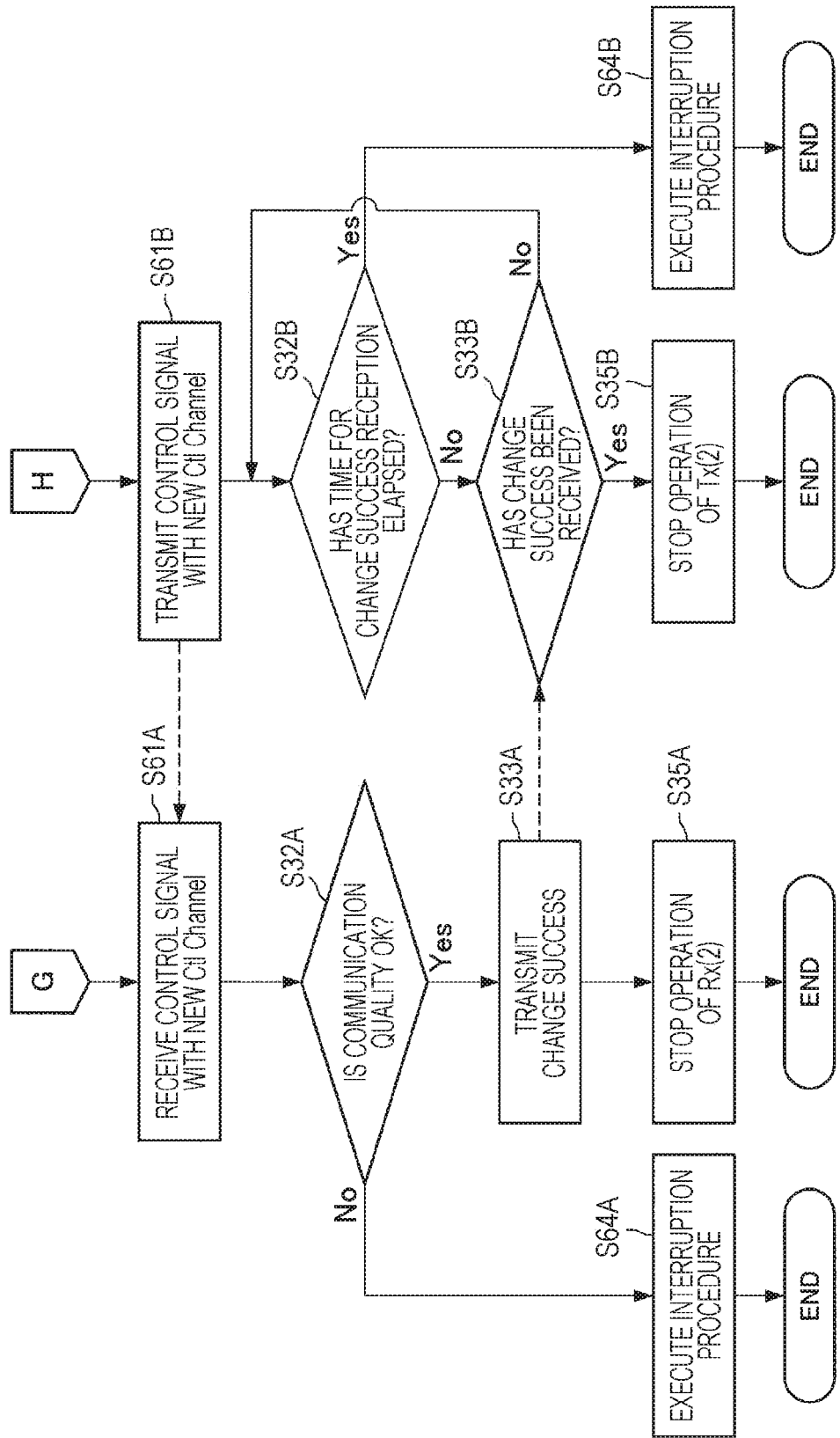

TRANSMISSION CONTROL DEVICE, TRANSMISSION CONTROL METHOD, RECEPTION CONTROL DEVICE, RECEPTION CONTROL METHOD, AND SIGNAL TRANSMISSION SYSTEM

CROSS REFERENCE TO RELATED APPLICATIONS

This application is a U.S. National Phase of International Patent Application No. PCT/JP2018/040077 filed on Oct. 29, 2018, which claims priority benefit of Japanese Patent Application No. JP 2017-245002 filed in the Japan Patent Office on Dec. 21, 2017. Each of the above-referenced applications is hereby incorporated herein by reference in its entirety.

TECHNICAL FIELD

The present disclosure relates to a transmission control device, a transmission control method, a reception control device, a reception control method, and a signal transmission system.

BACKGROUND ART

In recent years, high-definition multimedia interface (HDMI (registered trademark)), display port, and the like are sometimes used as standards for communication interfaces for transmitting digital signals such as video signals and audio signals. In such standards, a digital signal (main storm) such as a video signal and an audio signal, and a control signal related to the main stream are transmitted in parallel between two devices.

At this time, communication quality of a channel (main channel) for transmitting the main stream may be deteriorated. Therefore, for example, a technology is disclosed, which is capable of continuing transmission of a main stream without delaying or interrupting the transmission of the main stream even in a case where the communication quality in the main channel is deteriorated (for example, see Patent Document 1).

CITATION LIST

Patent Document

Patent Document 1: International Publication No. 2017/163529

SUMMARY OF THE INVENTION

Problems to be Solved by the Invention

However, it is desired to provide a technology capable of continuing transmission of a main stream without interrupting the transmission of the main stream even in a case where communication quality of a control signal is deteriorated in a case where the main stream and the control signal are transmitted in parallel between two devices.

Solutions to Problems

According to the present disclosure, provided is a transmission control device including an information acquisition unit configured to acquire a channel change request transmitted from a reception device in a case where communication quality of a control signal transmitted through a first channel and received by the reception device being poorer than first quality has been detected, and a transmission control unit configured to start transmission of the control signal to the reception device through a second channel different from the first channel in a case where the channel change request has been acquired, in which the transmission control unit stops transmission of the control signal through the first channel in a case where a predetermined condition has been satisfied since the start of transmission of the control signal through the second channel.

According to the present disclosure, provided is a transmission control method including acquiring a channel change request transmitted from a reception device in a case where communication quality of a control signal transmitted through a first channel and received by the reception device being poorer than first quality has been detected, starting transmission of the control signal to the reception device through a second channel different from the first channel in a case where the channel change request has been acquired, and stopping by a processor, transmission of the control signal through the first channel in a case where a predetermined condition has been satisfied since the start of transmission of the control signal through the second channel.

According to the present disclosure, provided is a reception control device including an information provision unit configured to provide a channel change request to a transmission device in a case where communication quality of a control signal transmitted from the transmission device through a first channel and received by a reception device being poorer than first quality has been detected, and a reception control unit configured to acquire the control signal in a case where transmission of the control signal has been started from the transmission device through a second channel different from the first channel on the basis of the channel change request and the control signal has been received by the reception device, in which transmission of the control signal through the first channel is stopped in a case where a predetermined condition has been satisfied since the start of transmission of the control signal through the second channel.

According to the present disclosure, provided is a reception control method including providing a channel change request to a transmission device in a case where communication quality of a control signal transmitted from the transmission device through a first channel and received by a reception device being poorer than first quality has been detected, acquiring, by a processor, the control signal in a case where transmission of the control signal has been started from the transmission device through a second channel different from the first channel on the basis of the channel change request and the control signal has been received by the reception device, and stopping transmission of the control signal through the first channel in a case where a predetermined condition has been satisfied since the start of transmission of the control signal through the second channel.

According to the present disclosure, provided is a signal transmission system including a transmission control device and a reception control device, the transmission control device including an information acquisition unit configured to acquire a channel change request transmitted from a reception device in a case where communication quality of a control signal transmitted through a first channel and received by the reception device being poorer than first quality has been detected, and a transmission control unit configured to start transmission of the control signal to the reception device through a second channel different from the first channel in a case where the channel change request has been acquired, in which the transmission control unit stops transmission of the control signal through the first channel in a case where a predetermined condition has been satisfied since the start of transmission of the control signal through the second channel, and the reception control device includes an information provision unit configured to provide the channel change request to a transmission device in a case where the communication quality of the control signal transmitted from the transmission device through the first channel and received by the reception device being poorer than the first quality has been detected, and a reception control unit configured to acquire the control signal in a case where transmission of the control signal has been started from the transmission device through the second channel on the basis of the channel change request and the control signal has been received by the reception device.

Effects of the Invention

As described above, according to the present disclosure, a technology is provided, which is capable of continuing transmission of a main stream without interrupting the transmission of the main stream even in a case where communication quality of a control signal is deteriorated in a case where the main stream and the control signal are transmitted in parallel between two devices. Note that the above-described effect is not necessarily limited, and any of effects described in the present specification or another effect that can be grasped from the present specification may be exerted in addition to or in place of the above-described effect.

BRIEF DESCRIPTION OF DRAWINGS

FIG. 12 is a flowchart illustrating an example of the operation of the signal transmission system according to the second embodiment.

MODE FOR CARRYING OUT THE INVENTION

Figure 1:
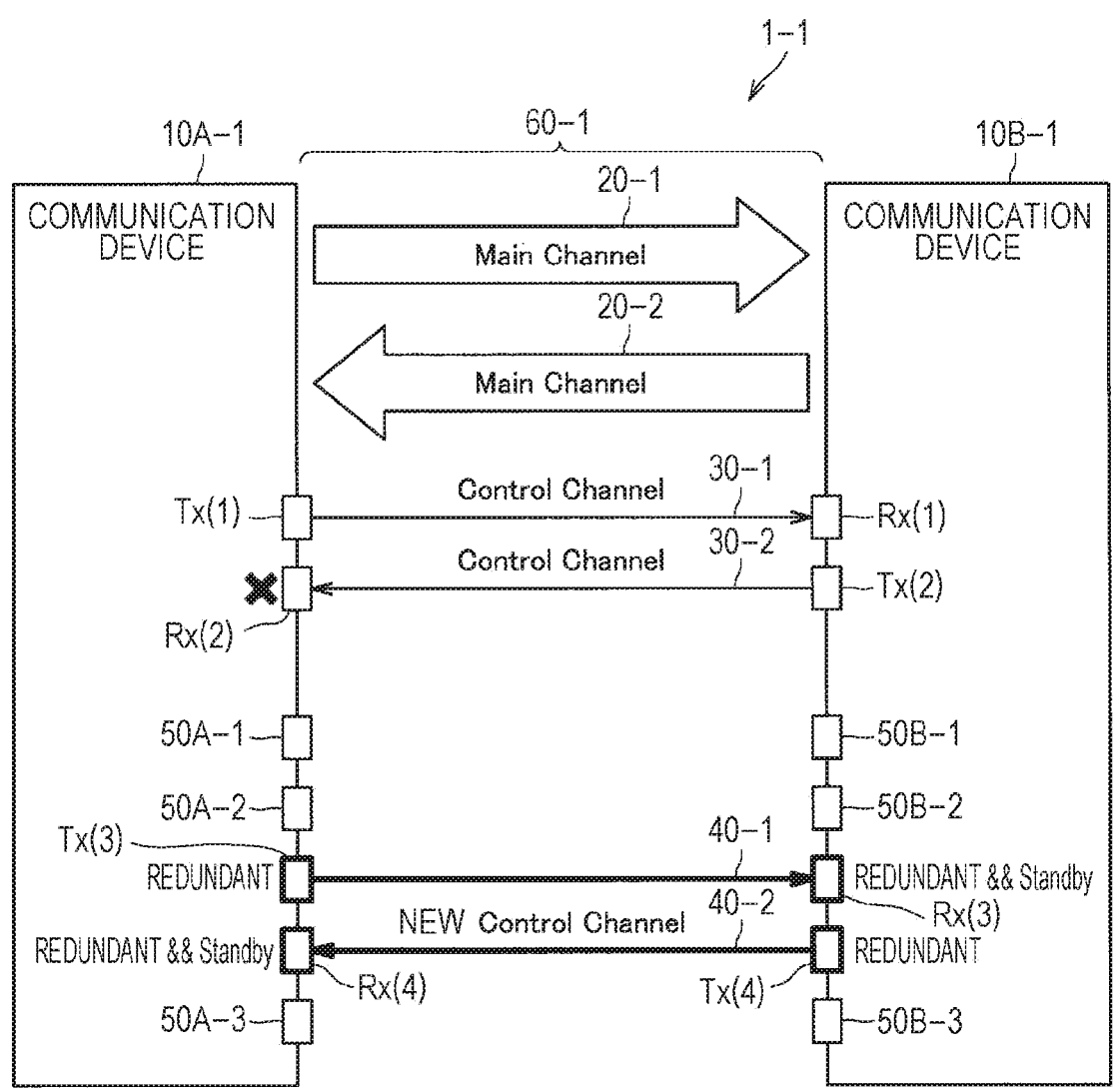
FIG. 1 is a diagram illustrating an example of a configuration of a signal transmission system according to a first embodiment.

Favorable embodiments of the present disclosure will be described in detail with reference to the appended drawings. Note that, in the present specification and drawings, redundant description of configuration elements having substantially the same functional configuration is omitted by providing the same reference numeral.

Furthermore, in the present specification and drawings, a plurality of configuration elements having substantially the same functional configurations is distinguished by different figures given after the same reference numeral. However, in a case where there is no need to distinguish, for example, the plurality of configuration elements having substantially the same functional configuration, only the same reference numeral will be given. Furthermore, similar configuration elements in different embodiments are distinguished by different alphabets given after the same reference numeral.

Note that the description will be given in the following order.

0. Background
1. First Embodiment
1.1. Configuration of Signal Transmission System
1.2. Configuration of Communication Device
1.3. Operation of Signal Transmission System
2. Second Embodiment
2.1. Configuration of Signal Transmission System
2.2. Configuration of Communication Device
2.3. Operation of Signal Transmission System
3. Conclusion

0. BACKGROUND

First, the background of the present embodiment will be described. In recent years, high-definition multimedia interface (HDMI (registered trademark)), display port, and the like are sometimes used as standards for communication interfaces for transmitting digital signals such as video signals and audio signals. In such standards, a channel (main channel) for transmitting a digital signal (main storm) such as a video signal and an audio signal and a channel for transmitting a control signal are fixedly defined.

However, in optical communication and the like, cases where communication quality is sharply deteriorated while a digital signal is being transmitted are known. Therefore, in a case where the fixedly defined channels are used, communication may be impaired if the communication quality is deteriorated. In particular, in a case where a control signal regarding a main stream is transmitted in parallel with the main stream, there are some cases where transmission of the main stream is hindered if the communication of the control signal is impaired.

Therefore, in the present embodiment, description of a technology will be mainly given, which is capable of continuing transmission of a main stream without interrupting transmission of the main stream even in a case where communication quality of a control signal is deteriorated in a case where the main stream and the control signal are transmitted in parallel between two devices.

The background of the present embodiment has been described.

1. FIRST EMBODIMENT

Next, a first embodiment will be described. In the first embodiment, a method of seamlessly switching a transmission channel for a control signal using a redundant channel will be mainly described.

(1.1. Configuration of Signal Transmission System)

First, a configuration example of a signal transmission system according to the first embodiment will be described. FIG. 1 is a diagram illustrating an example of a configuration of a signal transmission system 1-1 according to the first embodiment. As illustrated in FIG. 1, the signal transmission system 1-1 includes a communication device 10A-1 and a communication device 10B-1. Furthermore, the communication device 10A-1 and the communication device 10B-1 are connected via a cable 60-1.

The communication device 10A-1 includes a transmission unit Tx(1) for control channel and a reception unit Rx(2) for control channel. Furthermore, the communication device 10A-1 includes a transmission unit Tx(3) for redundant channel and a reception unit Rx(4) for redundant channel. In addition, the communication device 10A-1 includes a transmission unit 50A-1 for redundant channel, a reception unit 50A-2 for redundant channel, and a transmission unit 50A-3 for redundant channel.

The communication device 10B-1 includes a reception unit Rx(1) for control channel and a transmission unit Tx(2) for control channel. Furthermore, the communication device 10B-1 includes a reception unit Rx(3) for redundant channel and a transmission unit Tx(4) for redundant channel. In addition, the communication device 10B-1 includes a reception unit 50B-1 for redundant channel, a transmission unit 50B-2 for redundant channel, and a reception unit 50B-3 for redundant channel.

The cable 60-1 includes main channels 20-1 and 20-2, control channels 30-1 and 30-2, and redundant channels (surplus channels) 40-1 and 40-2.

The main channels 20-1 and 20-2 are transmission paths for transmitting a main stream (content). FIG. 1 illustrates a case in which the number of the main channels 20 is two. However, the number of main channels 20 is not particularly limited. That is, the number of main channels 20 may be one or plural. Furthermore, in the example illustrated in FIG. 1, two-way directional communication is available through the main channels 20-1 and 20-2. However, only one-way communication may be available through the main channels 20-1 and 20-2.

Note that, in each embodiment of the present disclosure, an example in which a video signal is handled as the main stream will be mainly described. However, other types of signals such as audio signals can be handled as the main stream, similarly to the video signal. The main stream may be transmitted after being divided into a plurality of signals on a transmission side and may be integrated into one main stream after being received as the plurality of signals on a reception side. Furthermore, in the example illustrated in FIG. 1, illustration of a reception unit and a transmission unit of each of the main channels 20-1 and 20-2 is omitted.

The control channels 30-1 and 30-2 are transmission paths for transmitting the control signal regarding the main stream. FIG. 1 illustrates a case in which the number of control channels 30 is two. However, the number of control channels 30 is not particularly limited. That is, the number of control channels 30 may be one or plural. Furthermore, as illustrated in FIG. 1, two-way communication is available through the control channels 30-1 and 30-2.

Note that the control signal is a signal regarding the main stream. The signal regarding the main stream is not particularly limited. For example, the signal regarding the main stream may be additional data regarding the main stream or the like (for example, a profile of the main stream or the like).

The redundant channels 40-1 and 40-2 are redundantly prepared transmission paths. The redundant channels 40-1 and 40-2 are not used for communication unless necessity arises, and may be used for communication when the necessity arises. Note that, in the example illustrated in FIG. 1, illustration of the redundant channels corresponding to the reception unit 50A-1 and the reception unit 50B-1, the redundant channels corresponding to the reception unit 50A-2 and the reception unit 50B-2, and the redundant channels corresponding to the reception unit 50A-3 and the reception unit 50B-3 is omitted.

The control signal transmitted by the transmission unit Tx(1) in the communication device 10A-1 is received by the reception unit Rx(1) in the communication device 10B-1 via the control channel 30-1. Furthermore, the control signal transmitted by the transmission unit Tx(2) in the communication device 10B-1 is received by the reception unit Rx(2) in the communication device 10A-1 via the control channel 30-2.

At this time, a case in which deterioration of the control signal transmitted through the control channel 30-1 is assumed. In such a case, transmission of the control signal by the transmission unit Tx(3) for redundant channel in the communication device 10A-1 is started. Such a control signal is transmitted through the redundant channel 40-1 and received by the reception unit Rx(3) for redundant channel in the communication device 10B-1. For example, in a case where the transmission of the control signal through the redundant channel 40-1 is stabilized, the transmission of the control signal through the control channel 30-1 may be stopped.

Furthermore, deterioration of the control signal transmitted through the control channel 30-2 is assumed. In such a case, transmission of the control signal by the transmission unit Tx(4) for redundant channel in the communication device 10B-1 is started. Such a control signal is transmitted through the redundant channel 40-2 and received by the reception unit Rx(4) for redundant channel in the communication device 10A-1. For example, in a case where the transmission of the control signal through the redundant channel 40-2 is stabilized, the transmission of the control signal through the control channel 30-2 may be stopped.

In each embodiment of the present disclosure, a case in which the main stream and the control signal are transmitted by an optical signal is mainly assumed. However, the main stream and control signal may be transmitted by another form of signals, such as electrical signals. Note that the communication device 10A-1 can function as a "reception device" and a "reception control device". At this time, the communication device 10B-1 can function as a "transmission device" and a "transmission control device". Meanwhile, the communication device 10A-1 can function as a "transmission device" and a "transmission control device". At this time, the communication device 10B-1 can function as a "reception device" and a "reception control device".

The configuration example of the signal transmission system 1-1 according to the first embodiment has been described.

(1.2. Configuration of Communication Device)

Next, a configuration example of a communication device 10 according to the first embodiment will be described.

Figure 2:
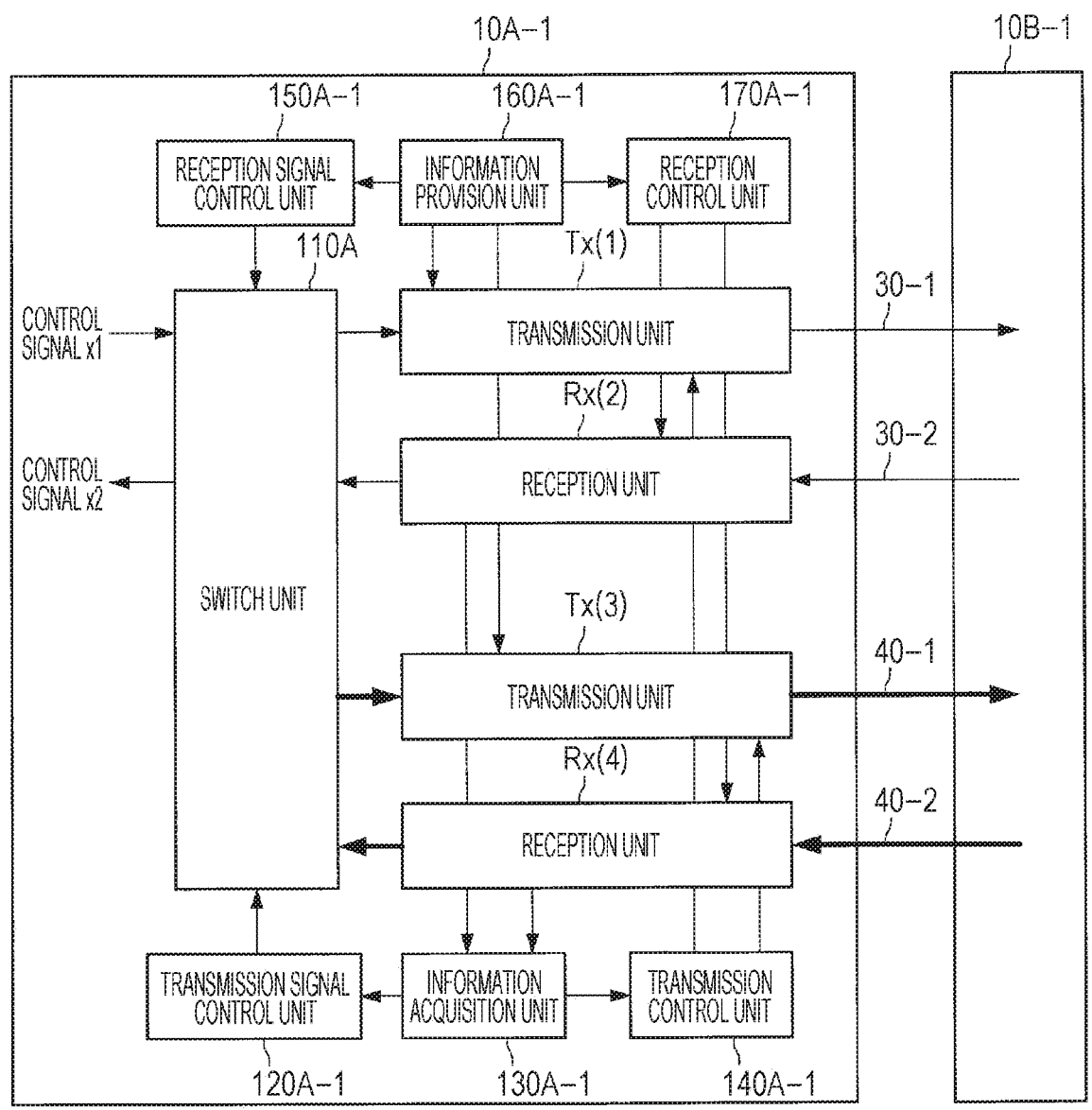
FIG. 2 is a diagram illustrating a functional configuration example of a first communication device according to the first embodiment.

FIG. 2 is a diagram illustrating a functional configuration example of the communication device 10A-1 according to the first embodiment. As illustrated in FIG. 2, the communication device 10A-1 includes a switch unit 110A, a transmission signal control unit 120A-1, an information acquisition unit 130A-1, a transmission control unit 140A-1, a reception signal control unit 150A-1, an information provision unit 160A-1, a reception control unit 170A-1, the transmission unit Tx(1), the reception unit Rx(2), the transmission unit Tx(3), and the reception unit Rx(4). Note that a configuration for transmitting and receiving a main stream is omitted from FIG. 2, in consideration of simplicity of the drawing.

Figure 3:
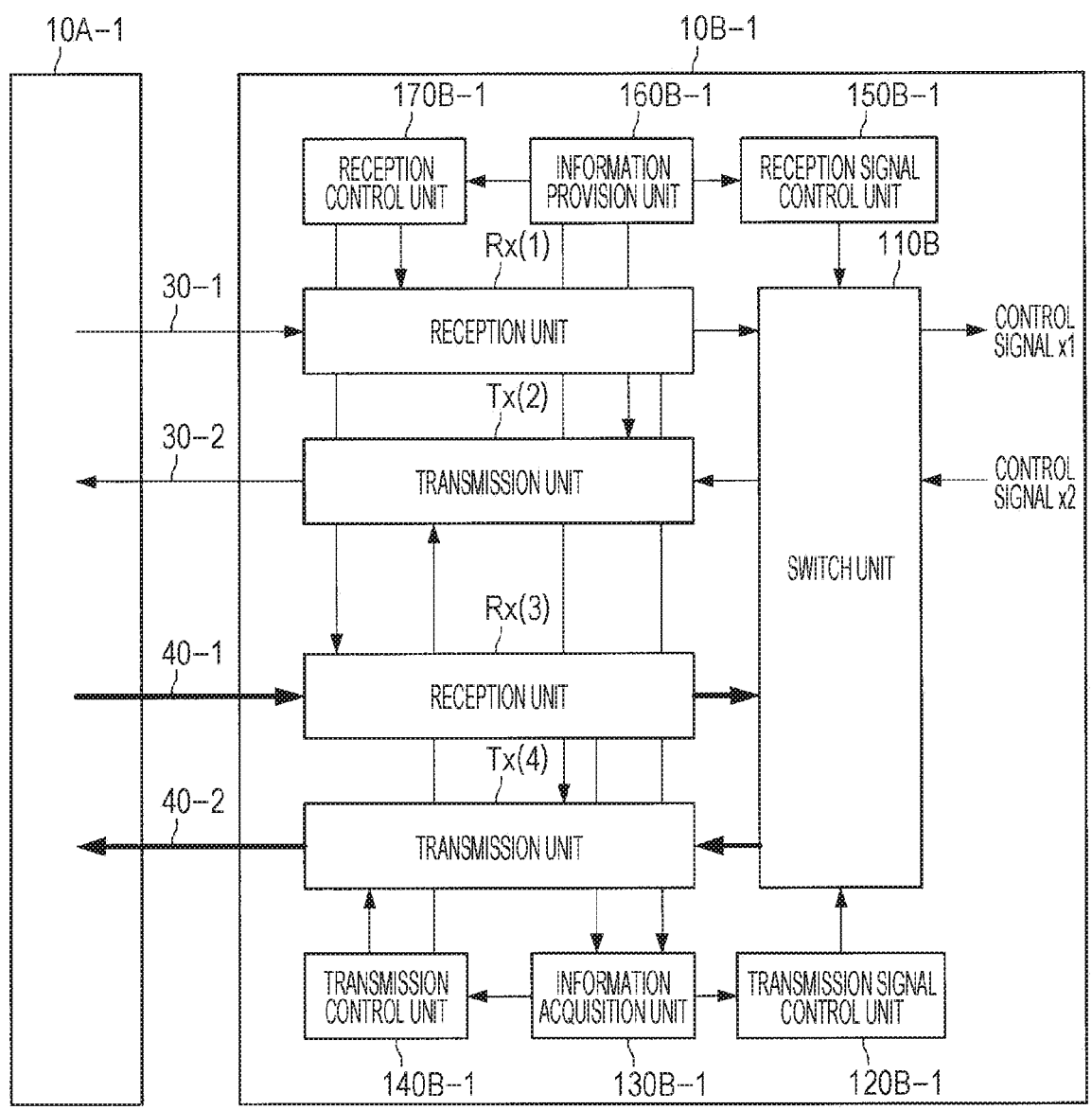
FIG. 3 is a diagram illustrating a functional configuration example of a second communication device according to the first embodiment.

FIG. 3 is a diagram illustrating a functional configuration example of the communication device 10B-1 according to the first embodiment. As illustrated in FIG. 3, the communication device 10B-1 includes a switch unit 110B, a transmission signal control unit 120B-1, an information acquisition unit 130B-1, a transmission control unit 140B-1, a reception signal control unit 150B-1, an information provision unit 160B-1, a reception control unit 170B-1, the reception unit Rx(1), the transmission unit Tx(2), the reception unit Rx(3), and the transmission unit Tx(4). Note that a configuration for transmitting and receiving the main stream is omitted from FIG. 3, in consideration of simplicity of the drawing.

As illustrated in FIGS. 2 and 3, a control signal x1 is transmitted from the communication device 10A-1 via the control channel 30-1 and received by the communication device 10B-1. Meanwhile, a control signal x2 is transmitted from the communication device 10B-1 via the control channel 30-2 and received by the communication device 10A-1.

Here, operations of the communication device 10A-1 and the communication device 10B-1 at the time of transmitting the control signal x1 are similar to operations of the communication device 10B-1 and the communication device 10A-1 at the time of transmitting the control signal x2. Therefore, hereinafter, the case in which the control signal x2 is transmitted from the communication device 10B-1 via the control channel 30-2 and received by the communication device 10A-1 will be described as an example.

In the communication device 10B-1, the transmission signal control unit 120B-1 recognizes that the control channel 30-2 is associated with the control signal x2 in advance, and controls the switch unit 110B such that the control signal x2 is input to the transmission unit Tx(2) connected to the control channel 30-2. Then, the switch unit 110B inputs the control signal x2 to the control channel 30-2 under the control by the transmission signal control unit 120B-1.

The transmission control unit 140B-1 controls transmission of the control signal x2 to the communication device 10A-1 via the control channel 30-2. More specifically, the transmission control unit 140B-1 controls the transmission unit Tx(2) connected to the control channel 30-2 such that the control signal x2 is transmitted by the transmission unit Tx(2) to the communication device 10A-1 by activating the transmission unit Tx(2).

The transmission unit Tx(2) transmits the control signal x2 to the communication device 10A-1 via the control channel 30-2 under the control by the transmission control unit 140B-1. More specifically, in the case where the transmission unit Tx(2) is activated by the transmission control unit 140B-1, the transmission unit Tx(2) starts transmission of the control signal x2 to the communication device 10A-1.

For example, the transmission unit Tx(2) includes a laser diode driver (LDD) and a laser diode (LD). The LDD drives the LD, and the LD outputs the control signal x2 input from the LDD to the control channel 30-2. Note that, in each embodiment of the present disclosure, a case in which the control channel 30-2 is configured by an optical fiber, and the LD converts the control signal x2 into an optical signal and transmits the optical signal to the communication device 10A-1 is assumed. However, the form of the control signal x2 is not limited. For example, the transmission unit Tx(2) may transmit the control signal x2 to the communication device 10A-1 by an electrical signal.

Note that other transmission unit in the signal transmission system 1-1, that is, the transmission unit Tx(1), the transmission unit Tx(3), and the transmission unit Tx(4) may be similarly configured to the transmission unit Tx(2).

In the communication device 10A-1, the reception control unit 170A-1 recognizes that the control channel 30-2 is associated with the control signal x2 in advance, and controls reception of the control signal x2 transmitted from the communication device 10B-1 through the control channel 30-2. More specifically, the reception control unit 170A-1 controls the reception unit Rx(2) connected to the control channel 30-2 such that the control signal x2 is received by the reception unit Rx(2) from the communication device 10B-1 by activating the reception unit Rx(2).

The reception unit Rx(2) receives the control signal x2 from the communication device 10B-1 via the control channel 30-2 under the control by the reception control unit 170A-1. More specifically, in the case where the reception unit Rx(2) is activated by the reception control unit 170A-1, the reception unit Rx(2) starts reception of the control signal x2 from the communication device 10B-1.

The reception unit Rx(2) includes a photodetector (PD) and an amplifier. The PD receives the control signal x2 transmitted as an optical signal from the communication device 10B-1 and converts the control signal x2 into an electrical signal. Note that, in each embodiment of the present disclosure, the case in which the control channel 30-2 is configured by an optical fiber, and the PD receives and converts the control signal x2 into an electrical signal is assumed. However, as described above, the form of the signal transmitted from the communication device 10B-1 to the communication device 10A-1 is not limited. For example, the communication device 10A-1 may receive the control signal x2 from the communication device 10B-1 by an electrical signal.

Note that other reception units in the signal transmission system 1-1, that is, the reception unit Rx(1), the reception unit Rx(3), and the reception unit Rx(4) may be similarly configured to the reception unit Rx(2).

The reception signal control unit 150A-1 controls the switch unit 110A such that the control signal x2 received by the reception unit Rx(2) connected to the control channel 30-2 is output to an output destination corresponding to the control signal x2. Then, the switch unit 110A outputs the control signal x2 to the output destination corresponding to the control signal x2 under the control by the reception signal control unit 150A-1.

Here, a case in which the communication quality of the control signal x2 transmitted through the control channel 30-2 is rapidly deteriorated is assumed. For example, in a case where the control signal x2 is transmitted by optical communication or the like, a case in which the communication quality of the control signal x2 is rapidly deteriorated during transmission of the control signal x2 due to sudden death of an optical device or the like is known.

Then, in the case where the communication quality of the control signal x2 transmitted through the control channel 30-2 is deteriorated, the deterioration may affect the main stream (main stream transmitted through the main channel 20-2) controlled using the control signal x2. For example, in a case where the control signal x2 is additional data or the like regarding the main stream (for example, a profile of the main stream or the like), the communication device 10A-1 that has received the main stream may not normally process the main stream.

Thus, the control signal x2 transmitted through the control channel 30-2 is an important signal for normal processing for the main stream. Therefore, it is required to ensure the communication quality of the control signal x2 while the control signal x2 is being transmitted.

Therefore, hereinafter, in the case where the communication quality of the control signal x2 transmitted from the communication device 10B-1 through the control channel 30-2 is deteriorated, a method of seamlessly switching the transmission channel of the control signal x2 using the redundant channels 40-1 and 40-2 will be mainly described.

First, the control signal x2 is transmitted by the transmission unit Tx(2) for control channel in the communication device 10B-1 through the control channel 30-2 (first channel) and is received by the reception unit Rx(2) for control channel in the communication device 10A-1. Then, it is assumed that deterioration of the communication quality of the control signal x2 has been detected by the reception unit Rx(2) for control channel.

For example, the deterioration of the communication quality of the control signal x2 can be detected when the communication quality of the control signal x2 is poorer than a first threshold (first quality). Here, any data may be used as the communication quality of the control signal x2. For example, the communication quality of the control signal x2 may be poorer as an error rate of the control signal x2 is higher, or the communication quality of the control signal x2 may be poorer as the degree of decrease in amplitude of the control signal x2 is larger.

In the case where deterioration of the communication quality of the control signal x2 has been detected by the reception unit Rx(2) for control channel, the information provision unit 160A-1 detects a reception unit for redundant channel in a standby state (that is, a reception unit in a state of being able to be activated from the communication device 10A-1), of the reception units for redundant channel of the communication device 10B-1, on the basis of the state of (one or a plurality of) reception units for redundant channel of the communication device 10B-1 recognized from information exchanged in advance at the time of establishing connection. In the example illustrated in FIG. 1, the reception unit Rx(3) for redundant channel in the standby state is detected.

The information provision unit 160A-1 activates the transmission unit Tx(3) for redundant channel facing the reception unit Rx(3) for redundant channel in the standby state. Then, the information provision unit 160A-1 provides the communication device 10B-1 with a channel change request (hereinafter also referred to as "control channel change request") via the transmission unit Tx(3) for redundant channel. Note that, here, a case in which the control channel change request also functions as a reception unit activation request is mainly assumed. However, the reception unit activation request may be separately provided from the control channel change request.

Note that the transmission of the control signal x2 through the control channel 30-2 may be continued after the control channel change request is provided to the communication device 10B-1. In the communication device 10B-1, the reception unit Rx(3) for redundant channel in the standby state is activated upon receiving the control channel change request. Then, the information acquisition unit 130B-1 acquires the control channel change request.

The information provision unit 160B-1 detects a reception unit for redundant channel in the standby state (that is, a reception unit in a state of being able to be activated from the communication device 10B-1), of the reception units for redundant channel of the communication device 10A-1, on the basis of the state of (one or a plurality of) reception units for redundant channel of the communication device 10A-1 recognized from information exchanged in advance at the time of establishing connection. In the example illustrated in FIG. 1, the reception unit Rx(4) for redundant channel in the standby state is detected.

Note that the reception unit for redundant channel in the standby state, of the reception units for redundant channel of the communication device 10A-1, may be detected by another method. As an example, the reception unit for redundant channel in the standby state, of the reception units for redundant channel of the communication device 10A-1, may be specified in the control channel change request by the communication device 10A-1. Alternatively, the communication device 10A-1 may set all the reception units for redundant channel of the communication device 10A-1 to the standby state at the time of transmitting the control channel change request.

The information provision unit 160B-1 activates the transmission unit Tx(4) for redundant channel facing the reception unit Rx(4) for redundant channel in the standby state. Then, the information provision unit 160B-1 provides the communication device 10A-1 with a channel change acceptance (hereinafter also referred to as "control channel change acceptance") via the transmission unit Tx(4) for redundant channel. Note that, here, a case in which the control channel change acceptance also functions as a reception unit activation request is mainly assumed. However, the reception unit activation request may be separately provided from the control channel change acceptance.

In the communication device 10A-1, the reception unit Rx(4) for redundant channel in the standby state is activated upon receiving the control channel change acceptance. Note that, as described above, a case in which the reception unit for redundant channel in the standby state, of the reception units for redundant channel of the communication device 10A-1, is specified by the communication device 10A-1 is assumed. In such a case, the communication device 10A-1 can autonomously activate the reception unit Rx(4) for redundant channel in the standby state even if the control channel change acceptance is not received.

The information provision unit 160A-1 provides the communication device 10B-1 with a Duplicate request via the transmission unit Tx(3) for redundant channel. That is, here, the case in which transmission of the control signal x2 through the control channel 30-2 is continued is assumed. Therefore, the transmission unit Tx(3) for redundant channel transmits the Duplicate request for requesting transmission of the control signal x2 to the communication device 10B-1 in parallel with transmission of the control signal x2 through the control channel 30-2.

In the communication device 10B-1, when the information acquisition unit 130B-1 acquires the Duplicate request via the reception unit Rx(3) for redundant channel, the transmission control unit 140B-1 starts to transmit the control signal x2 to the communication device 10A-1 through the redundant channel 40-2 (second channel) by the transmission unit Tx(4) for redundant channel. Thereby, the transmission unit Tx(4) for redundant channel starts to transmit the control signal x2 to the communication device 10A-1 in parallel with transmission of the control signal x2 through the control channel 30-2.

More specifically, when the information acquisition unit 130B-1 acquires the Duplicate request via the reception unit Rx(3) for redundant channel, the transmission signal control unit 120B-1 controls the switch unit 110B such that the control signal x2 is input to the transmission unit Tx(4) for redundant channel connected to the redundant channel 40-2 (second channel). Then, the transmission control unit 140B-1 controls the transmission unit Tx(4) for redundant channel such that transmission, through the redundant channel 40-2, of the control signal x2 input to the transmission unit Tx(4) is started.

Meanwhile, in the communication device 10A-1, when the information provision unit 160A-1 provides the Duplicate request via the transmission unit Tx(3) for redundant channel, the reception control unit 170A-1 starts reception of the control signal x2 transmitted from the communication device 10B-1, by the reception unit Rx(4) for redundant channel. Thereby, the reception unit Rx(4) for redundant channel starts to receive the control signal x2 from the communication device 10B-1 in parallel with transmission of the control signal x2 through the control channel 30-2.

More specifically, when the information provision unit 160A-1 provides the Duplicate request via the transmission unit Tx(3) for redundant channel, the reception control unit 170A-1 controls the reception unit Rx(4) for redundant channel connected to the redundant channel 40-2 such that reception of the control signal x2 by the reception unit Rx(4), transmission of which has been started, is started. The reception signal control unit 150A-1 controls the switch unit 110A such that the control signal x2 received by the reception unit Rx(4) for redundant channel is output to an output destination corresponding to the control signal x2.

The reception unit Rx(4) for redundant channel detects the communication quality of the control signal x2 that the reception unit Rx(4) itself receives. Then, in a case where the reception unit Rx(4) for redundant channel has detected that the communication quality of the control signal x2 that the reception unit Rx(4) itself receives is better than a second threshold (second quality), the information provision unit 160A-1 provides the communication device 10B-1 with change success (transmission stop request) via the transmission unit Tx(3) for redundant channel.

The reception control unit 170A-1 stops reception of the control signal x2 by the reception unit Rx(2) for control channel via the control channel 30-2 in a case where a predetermined condition has been satisfied since the start of reception of the control signal x2 by the reception unit Rx(4) for redundant channel. More specifically, the reception control unit 170A-1 may stop the operation of the reception unit Rx(2) for control channel in a case where the information provision unit 160A-1 has provided the change success via the transmission unit Tx(3) for redundant channel. At this time, the reception control unit 170A-1 may stop the operation of the transmission unit Tx(3) for redundant channel. Thereby, reduction of power consumption is expected.

In the communication device 10B-1, the transmission control unit 140B-1 stops transmission of the control signal x2 by the transmission unit Tx(2) for control channel via the control channel 30-2 in a case where a predetermined condition has been satisfied since the start of transmission of the control signal x2 by the transmission unit Tx(4) for redundant channel. More specifically, the transmission control unit 140B-1 may stop the operation of the transmission unit Tx(2) for control channel in a case where the information acquisition unit 130B-1 has acquired the change success via the reception unit Rx(3) for redundant channel. At this time, the transmission control unit 140B-1 may stop the operation of the reception unit Rx(3) for redundant channel. Thereby, reduction of power consumption is expected.

Note that, in the above description, the condition that the communication quality of the control signal x2 transmitted by the communication device 10B-1 through the redundant channel 40-2 and received by the communication device 10A-1 is better than the second threshold is assumed as an example of the predetermined condition. However, the predetermined condition is not limited to such a case. For example, the predetermined condition may be a condition that a predetermined time has elapsed since the start of transmission of the control signal x2 by the transmission unit Tx(4) for redundant channel.

The configuration example of the communication device 10 according to the first embodiment has been described.

(1.3. Operation of Signal Transmission System)

Next, an example of an operation of the signal transmission system 1-1 according to the first embodiment will be described.

Figure 4:
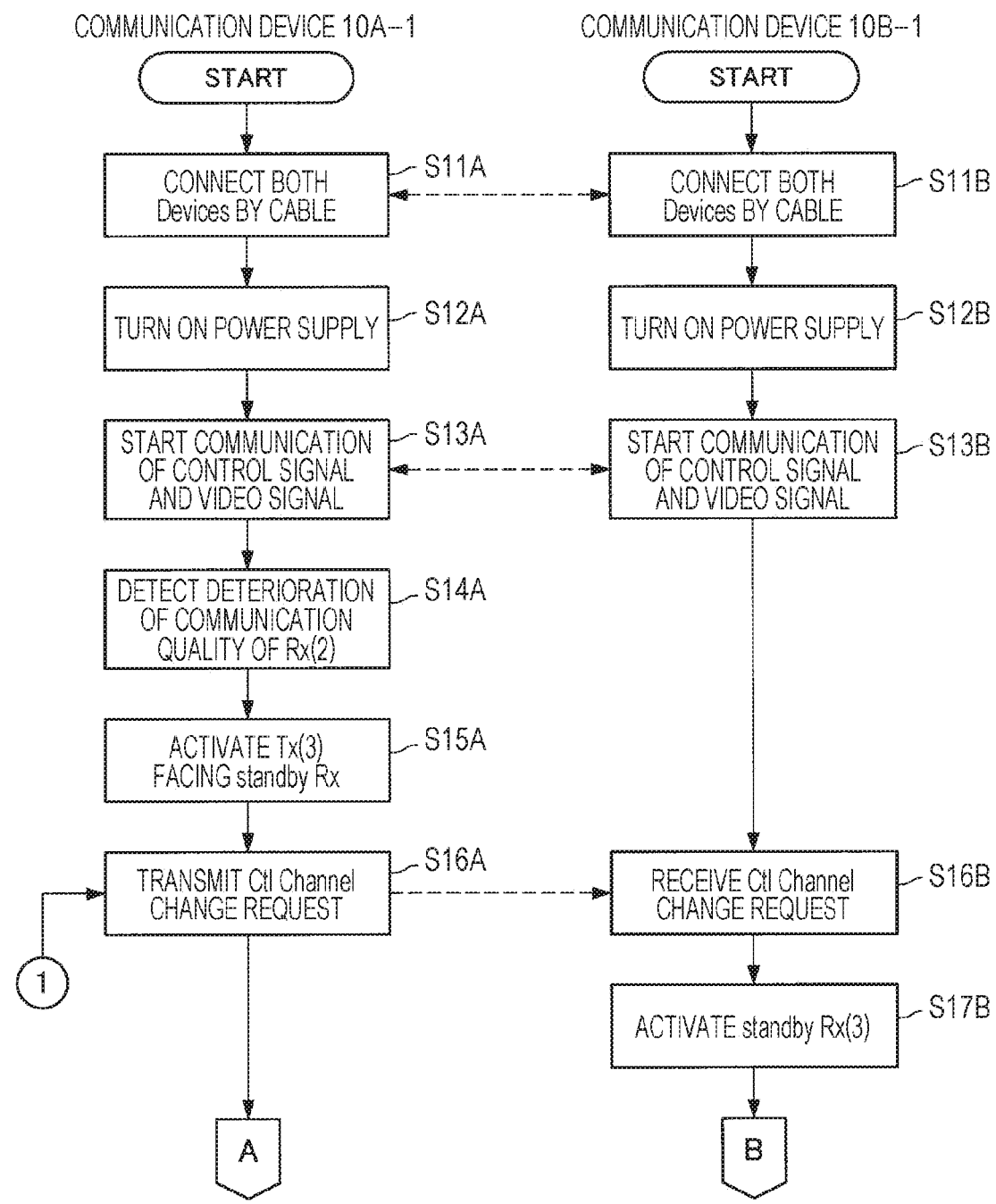
FIG. 4 is a flowchart illustrating an example of an operation of the signal transmission system according to the first embodiment.
Figure 5:
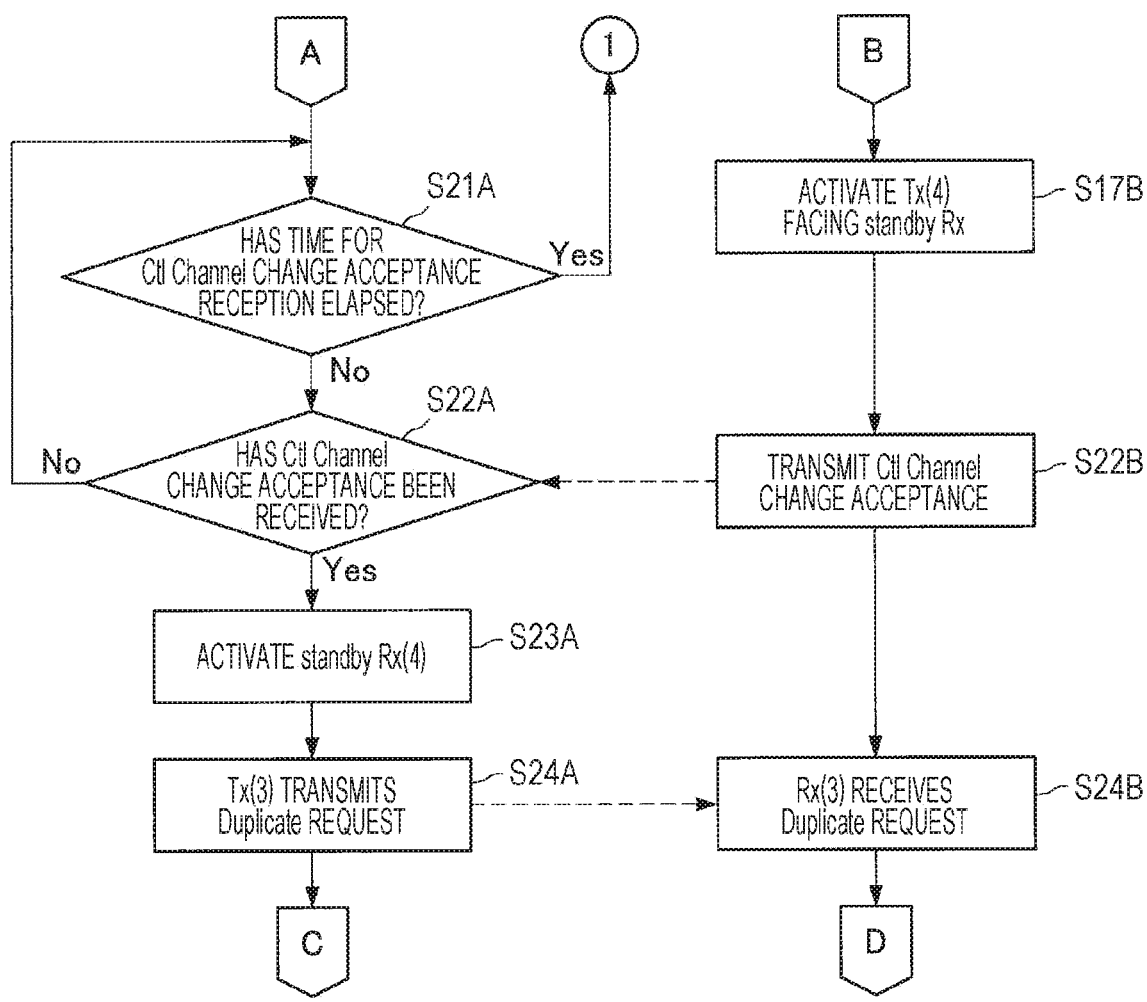
FIG. 5 is a flowchart illustrating an example of the operation of the signal transmission system according to the first embodiment.
Figure 6:
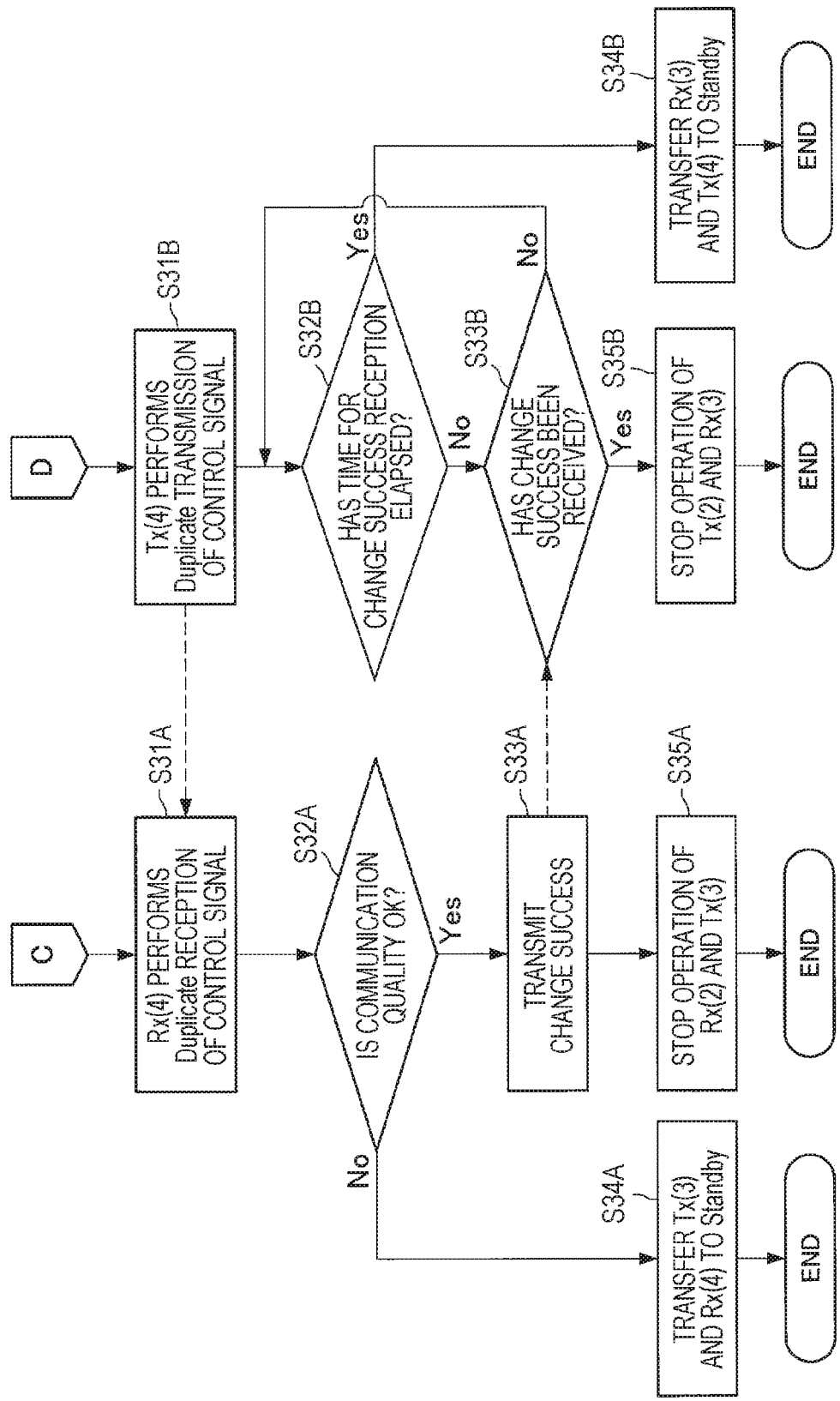
FIG. 6 is a flowchart illustrating an example of the operation of the signal transmission system according to the first embodiment.

FIGS. 4 to 6 are flowcharts illustrating examples of the operation of the signal transmission system 1-1 according to the first embodiment. First, an example of the operation of the communication device 10A-1 that provides the control channel change request will be described and then an example of the operation of the communication device 10B-1 that acquires the control channel change request will be described with reference to FIGS. 4 to 6 (and also FIGS. 1 to 3 as appropriate). First, an example of the operation of the communication device 10A-1 that provides the control channel change request will be described.

As illustrated in FIG. 4, both the devices (the communication devices 10A-1 and 10B-1) are connected by the cable 60-1 (S11A) and a power supply of the communication device 10A-1 is turned ON (S12A), the communication device 10A-1 starts communication of a control signal and a video signal with the communication device 10B-1 (S13A). Here, a case in which the reception unit Rx(2) for control channel has detected deterioration of the communication quality of the control signal x2 that the reception unit Rx(2) for control channel receives is assumed (S14A).

At this time, the information provision unit 160A-1 detects a reception unit for redundant channel in the standby state, of (one or a plurality of) reception units for redundant channel of the communication device 10B-1. For example, when the information provision unit 160A-1 detects the reception unit Rx(3) for redundant channel in the standby state, the information provision unit 160A-1 activates the transmission unit Tx(3) for redundant channel facing the reception unit Rx(3) for redundant channel in the standby state (S15A). Then, the transmission unit Tx(3) for redundant channel provides the communication device 10B-1 with the control channel change request (S16A).

As illustrated in FIG. 5, in the communication device 10A-1, in a case where the time since provision of the control channel change request has passed a standby time for receiving the control channel change acceptance ("Yes" in S21A), the operation is moved onto retransmission of the control channel change request in S16A. Meanwhile, in the communication device 10A-1, in a case where the time since provision of the control channel change request has not passed the standby time for receiving the control channel change acceptance ("No" in S21A), the operation is moved onto S22A.

Next, in a case where the reception unit Rx(4) for redundant channel in the standby state has not received the control channel change acceptance ("No" in S22A), the operation is moved onto the determination as to whether or not the time since provision of the control channel change request in S21A has passed the standby time for receiving the control channel change acceptance. On the other hand, in a case where the reception unit Rx(4) for redundant channel in the standby state has received the control channel change acceptance ("Yes in S22A), the reception unit Rx(4) for redundant channel is activated upon receiving the control channel change acceptance (S23A). The transmission unit Tx(3) for redundant channel transmits the Duplicate request to the communication device 10B-1 (S24A).

As illustrated in FIG. 6, when Duplicate transmission of the control signal based on the Duplicate request (transmission of the same control signal as the control signal transmitted through the control channel 30-2) is performed by the communication device 10B-1, the reception unit Rx(4) for redundant channel performs Duplicate reception of the control signal (reception of the same control signal as the control signal transmitted through the control channel 30-2) (S31A). The reception unit Rx(4) for redundant channel confirms that the control signal that the reception unit Rx(4) itself receives and the control signal received via the control channel 30-2 are the same.

Note that whether or not the control signal that the reception unit Rx(4) for redundant channel itself receives and the control signal received via the control channel 30-2 are the same may be confirmed in any way. As an example, whether or not the control signals are the same may be confirmed according to whether or not cyclic redundancy check (CRC) attached to the control signal that the reception unit Rx(4) for redundant channel receives and CRC attached to the control signal received via the control channel 30-2 are the same.

Next, in a case where the communication quality of the control signal that the reception unit Rx(4) for redundant channel receives is not good (NG), that is, in a case where the communication quality being better than the second threshold (second quality) is not detected ("No" in S32A), the activated state of the transmission unit Tx(3) for redundant channel and the reception unit Rx(4) for redundant channel is transitioned to the standby state (S34A). Thereby, reduction of power consumption is expected.

Meanwhile, in a case where the communication quality of the control signal that the reception unit Rx(4) for redundant channel receives is good (OK), that is, in a case where the communication quality being better than the second threshold (second quality) has been detected ("Yes" in S32A), the transmission unit Tx(3) for redundant channel transmits the change success (S33A), and the operations of the reception unit Rx(2) for control channel and the transmission unit Tx(3) for redundant channel are stopped (S35A). Thereby, reduction of power consumption is expected.

Next, an example of an operation of the communication device 10B-1 that acquires the control channel change request will be described with reference to FIGS. 4 to 6 (and FIGS. 1 to 3 as appropriate).

As illustrated in FIG. 4, both the devices (the communication devices 10A-1 and 10B-1) are connected by the cable 60-1 (S11B) and a power supply of the communication device 10B-1 is turned ON (S12B), the communication device 10B-1 starts communication of a control signal and a video signal with the communication device 10A-1 (S13B). Here, a case in which the reception unit Rx(2) for control channel in the communication device 10A-1 has detected deterioration of the communication quality of the control signal x2 is assumed.

At this time, the reception unit Rx(4) for redundant channel in the standby state receives the control channel change request from the communication device 10A-1 (S16B) and is activated upon receiving the control channel change request (S17B). Then, the information provision unit 160B-1 detects a reception unit for redundant channel in the standby state (that is, a reception unit in a state of being able to be activated from the communication device 10B-1), of the reception units for redundant channel of the communication device 10A-1, on the basis of the state of (one or a plurality of) reception units for redundant channel of the communication device 10A-1. Here, a case in which the reception unit Rx(4) for redundant channel in the standby state has been detected is assumed.

As illustrated in FIG. 5, in the communication device 10B-1, the transmission unit Tx(4) for redundant channel facing the reception unit Rx(4) for redundant channel in the standby state is activated (S17B). The transmission unit Tx(4) for redundant channel transmits the control channel change acceptance. Then, the reception unit Rx(3) for redundant channel receives the Duplicate request from the communication device 10A-1 (S24B).

As illustrated in FIG. 6, the transmission unit Tx(4) for redundant channel performs Duplicate transmission of the control signal based on the Duplicate request (transmission of the same control signal as the control signal transmitted through the control channel 30-2) (S31B). In the communication device 10B-1, in a case where the time since the start of Duplicate transmission of the control signal has passed a standby time for receiving the change success ("Yes" in S32B), the activated state of the reception unit Rx(3) for redundant channel and the transmission unit Tx(4) for redundant channel is transitioned to the standby state (S34B). Thereby, reduction of power consumption is expected.

On the other hand, in the communication device 10B-1, in a case where the time since the start of Duplicate transmission of the control signal has passed the standby time for receiving the change success ("No" in S32B), the operation is moved onto S33B.

Next, in a case where the reception unit Rx(3) for redundant channel has not received the change success ("No" in S33B), the operation is moved onto determination as to whether or not the time since the start of Duplicate transmission of the control signal in S32B has passed the standby time for receiving the change success. On the other hand, in a case where the reception unit Rx(3) for redundant channel has received the change success ("Yes" in S33B), the operations of the transmission unit Tx(2) for control channel and the reception unit Rx(3) for redundant channel are stopped (S35B). Thereby, reduction of power consumption is expected.

The operation example of the signal transmission system 1-1 according to the first embodiment has been described.

2. SECOND EMBODIMENT

Next, a second embodiment will be described. In the second embodiment, a method of seamlessly switching a transmission channel of a control signal by releasing a part of a plurality of main channels and using the released channel will be mainly described.

(2.1. Configuration of Signal Transmission System)

Figure 7:
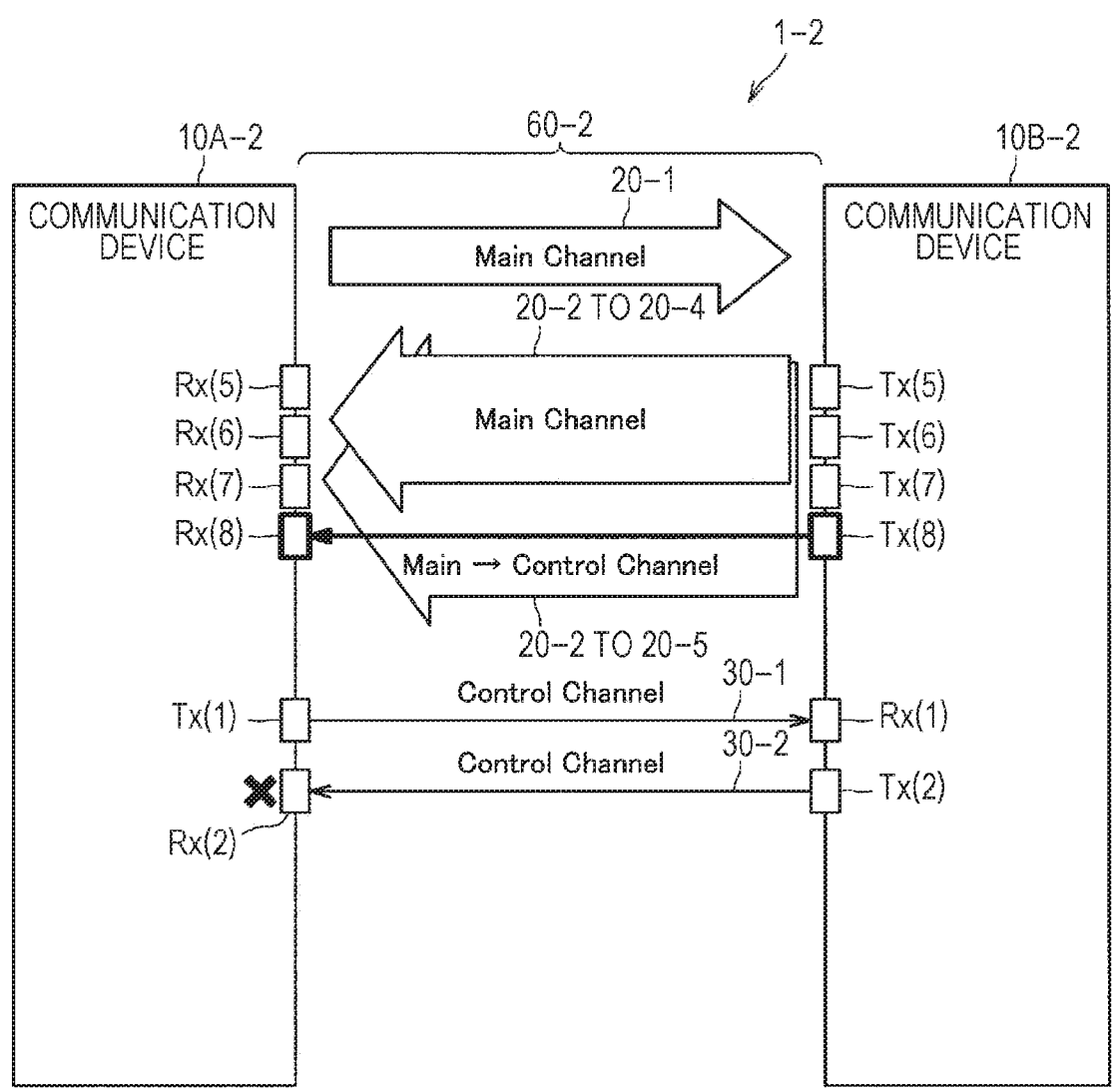
FIG. 7 is a diagram illustrating an example of a configuration of a signal transmission system according to a second embodiment.

First, a configuration example of a signal transmission system according to the second embodiment will be described. FIG. 7 is a diagram illustrating an example of a configuration of a signal transmission system 1-2 according to the second embodiment. As illustrated in FIG. 7, the signal transmission system 1-2 includes a communication device 10A-2 and a communication device 10B-2. Furthermore, the communication device 10A-2 and the communication device 10B-2 are connected via a cable 60-2.

The communication device 10A-2 includes a transmission unit Tx(1) for control channel and a reception unit Rx(2) for control channel, similarly to the communication device 10A-1 according to the first embodiment. Meanwhile, the communication device 10A-2 may not include a transmission unit for redundant channel and a reception unit for redundant channel, unlike the communication device 10A-1 according to the first embodiment. Furthermore, the communication device 10A-2 includes reception units Rx(5) to Rx(8) for main channel.

The communication device 10B-2 includes a reception unit Rx(1) for control channel and a transmission unit Tx(2) for control channel, similarly to the communication device 10B-1 according to the first embodiment. Meanwhile, the communication device 10B-2 may not include a transmission unit for redundant channel and a reception unit for redundant channel, unlike the communication device 10B-1 according to the first embodiment. Furthermore, the communication device 10B-2 includes transmission units Tx(5) to Tx(8) for main channel.

The cable 60-2 includes main channels 20-1 to 20-5 and control channels 30-1 and 30-2.

The main channels 20-1 to 20-5 are transmission paths for transmitting a main stream (content). FIG. 7 illustrates a case in which the number of main channels 20 is five. However, the number of the main channels 20 is not particularly limited as long as the number is plural. Furthermore, in the example illustrated in FIG. 7, two-way communication is available through the main channels 20-1 to 20-5. However, only one-way communication may be available through the main channels 20-1 to 20-5.

The main stream transmitted through the main channel 20, the control channel 30, and the control signal transmitted through the control channel 30 are as already described in the first embodiment. Note that, in the example illustrated in FIG. 7, illustration of a reception unit and a transmission unit of each of the main channels 20-1 to 20-5 is omitted.

Here, a case in which deterioration of the control signal transmitted through the control channel 30-2 is assumed. In such a case, a part of the main channels 20-2 to 20-5 is changed to a control channel by format change of a video signal transmitted through the main channels 20-2 to 20-5 and transmission structure change, and transmission of the control signal through the control channel is started. In the example illustrated in FIG. 7, the main channel 20-5 is changed to the control channel, and the main channels 20-2 to 20-4 are maintained. Note that similar processing may be executed even in a case where the control signal transmitted through the control channel 30-1 is deteriorated.

Even in the second embodiment, the communication device 10A-2 can function as a "reception device" and a "reception control device", similarly to the first embodiment. At this time, the communication device 10B-2 can function as a "transmission device" and a "transmission control device". Meanwhile, the communication device 10A-2 can function as a "transmission device" and a "transmission control device". At this time, the communication device 10B-2 can function as a "reception device" and a "reception control device".

The configuration example of the signal transmission system 1-2 according to the second embodiment has been described.

(2.2. Configuration of Communication Device)

Next, a configuration example of the communication device 10 according to the second embodiment will be described.

Figure 8:
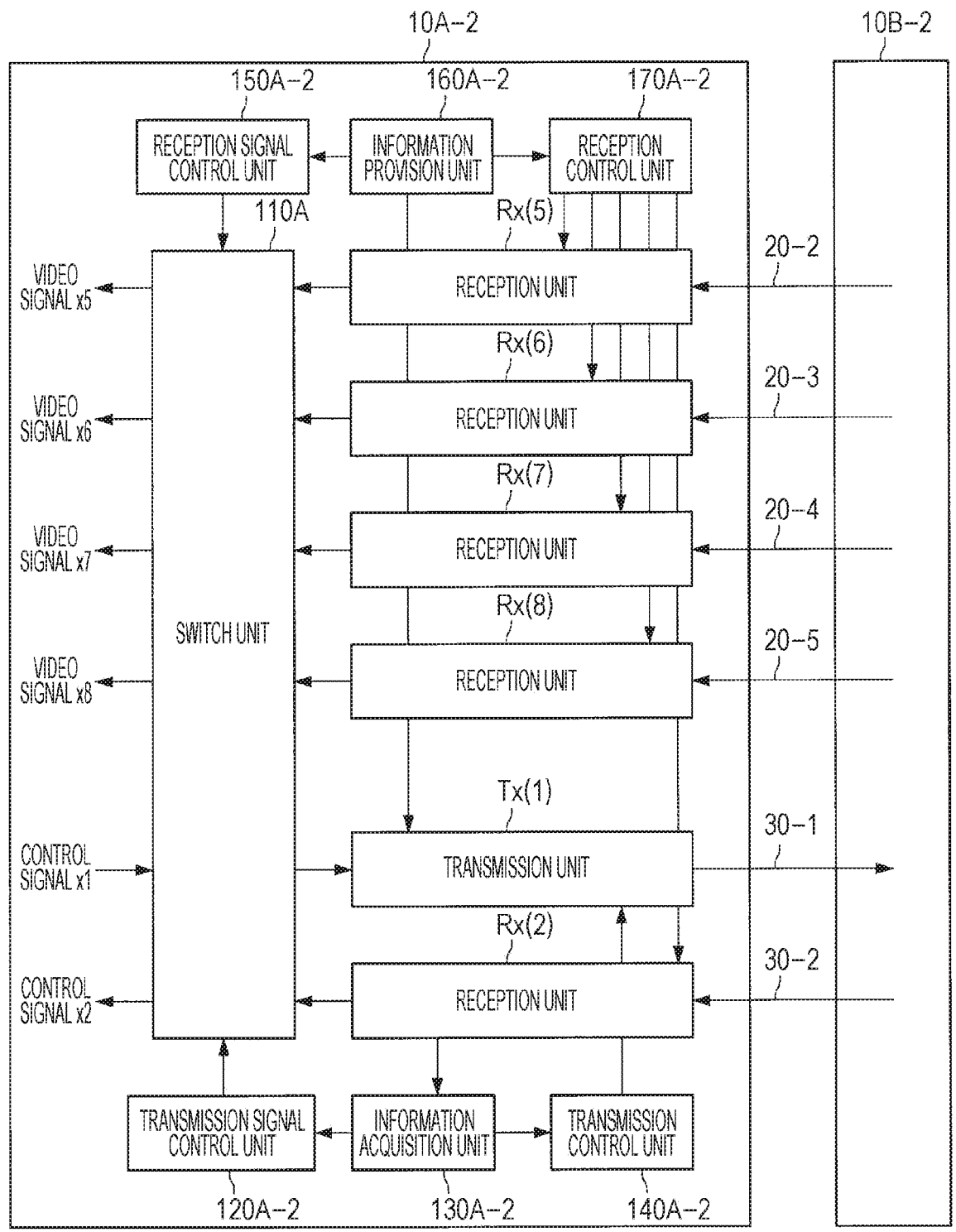
FIG. 8 is a diagram illustrating a functional configuration example of a first communication device according to the second embodiment.

FIG. 8 is a diagram illustrating a functional configuration example of the communication device 10A-2 according to the second embodiment. As illustrated in FIG. 8, the communication device 10A-2 includes a switch unit 110A, a transmission signal control unit 120A-2, an information acquisition unit 130A-2, a transmission control unit 140A-2, a reception signal control unit 150A-2, an information provision unit 160A-2, a reception control unit 170A-2, the reception unit Rx(2), the reception units Rx(5) to Rx(8), and the transmission unit Tx(1). Note that a configuration for transmitting a main stream via the main channel 20-1 is omitted from FIG. 8, in consideration of simplicity of the drawing.

Figure 9:
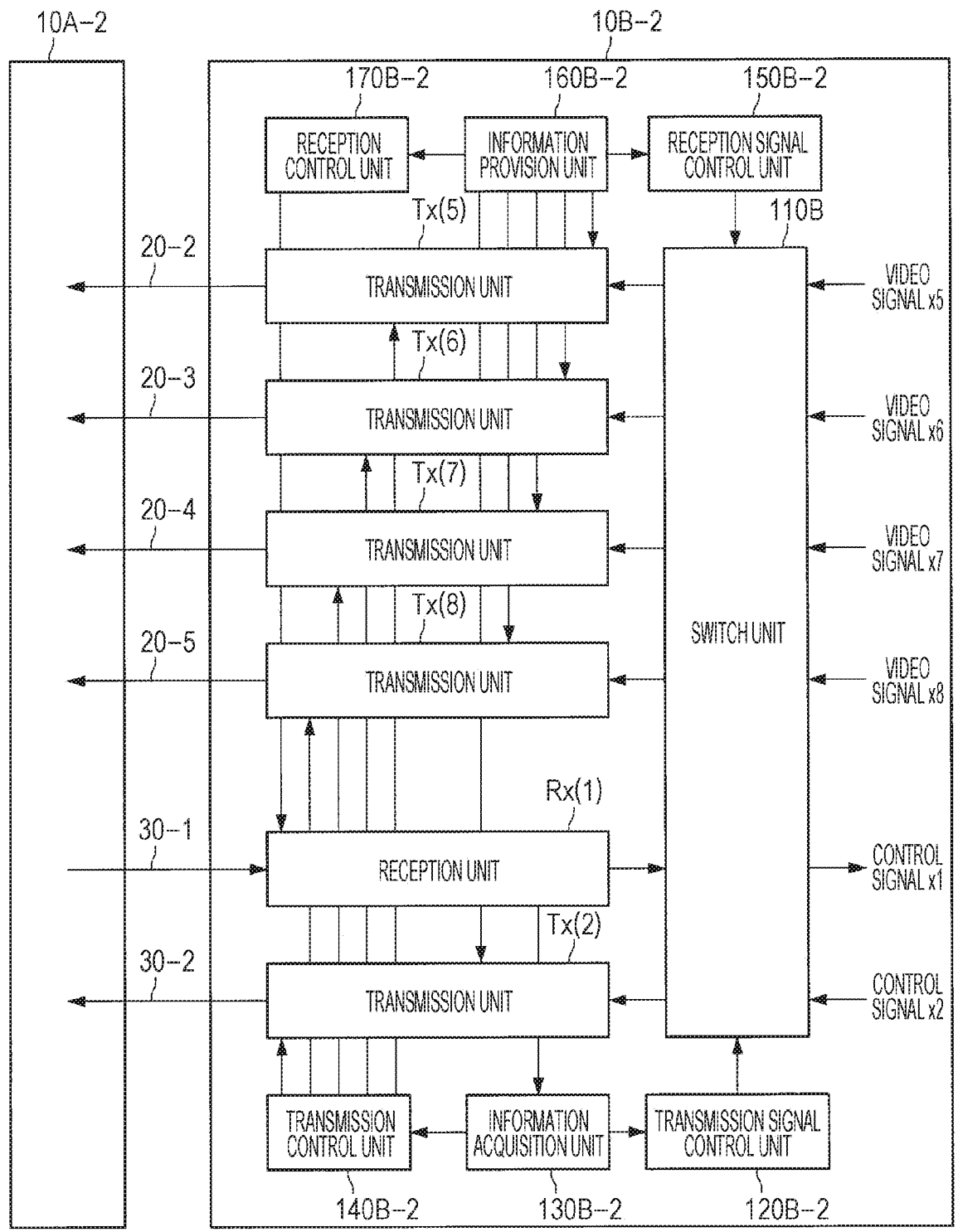
FIG. 9 is a diagram illustrating a functional configuration example of a second communication device according to the second embodiment.

FIG. 9 is a diagram illustrating a functional configuration example of the communication device 10B-2 according to the second embodiment. As illustrated in FIG. 9, the communication device 10B-2 includes a switch unit 110B, a transmission signal control unit 120B-2, an information acquisition unit 130B-2, a transmission control unit 140B-2, a reception signal control unit 150B-2, an information provision unit 160B-2, a reception control unit 170B-2, the transmission unit Tx(2), the transmission units Tx(5) to Tx(8), and the reception unit Rx(1). Note that a configuration for receiving a main stream via the main channel 20-1 is omitted from FIG. 9, in consideration of simplicity of the drawing.

Even in the second embodiment, a control signal $x1$ is transmitted from the communication device 10A-2 via the control channel 30-1 and received by the communication device 10B-2, similarly to the first embodiment. Meanwhile, a control signal $x2$ is transmitted from the communication device 10B-2 via the control channel 30-2 and received by the communication device 10A-2.

Here, operations of the communication device 10A-2 and the communication device 10B-2 at the time of transmitting the control signal $x1$ are similar to operations of the communication device 10B-2 and the communication device 10A-2 at the time of transmitting the control signal $x2$. Therefore, hereinafter, the case in which the control signal $x2$ is transmitted from the communication device 10B-2 via the control channel 30-2 and received by the communication device 10A-2 will be described as an example.

In the communication device 10B-2, the transmission signal control unit 120B-2 recognizes that the control channel 30-2 is associated with the control signal $x2$ in advance, and controls the switch unit 110B such that the control signal $x2$ is input to the transmission unit Tx(2) connected to the control channel 30-2. Then, the switch unit 110B inputs the control signal $x2$ to the control channel 30-2 under the control by the transmission signal control unit 120B-2.

The transmission control unit 140B-2 controls transmission of the control signal $x2$ to the communication device 10A-2 via the control channel 30-2. More specifically, the transmission control unit 140B-2 controls the transmission unit Tx(2) connected to the control channel 30-2 such that the control signal x2 is transmitted by the transmission unit Tx(2) to the communication device 10A-2 by activating the transmission unit Tx(2).

The transmission unit Tx(2) transmits the control signal x2 to the communication device 10A-2 via the control channel 30-2 under the control by the transmission control unit 140B-2. More specifically, in the case where the transmission unit Tx(2) is activated by the transmission control unit 140B-2, the transmission unit Tx(2) starts transmission of the control signal x2 to the communication device 10A-2.

Note that the transmission unit Tx(2) may be similarly configured to the transmission unit Tx(2) according to the first embodiment. Then, other transmission unit in the signal transmission system 1-2, that is, the transmission unit Tx(1) and the transmission units Tx(5) to Tx(8) may be similarly configured to the transmission unit Tx(2).

In the communication device 10A-2, the reception control unit 170A-2 recognizes that the control channel 30-2 is associated with the control signal x2 in advance, and controls reception of the control signal x2 transmitted from the communication device 10B-2 through the control channel 30-2. More specifically, the reception control unit 170A-2 controls the reception unit Rx(2) connected to the control channel 30-2 such that the control signal x2 is received by the reception unit Rx(2) from the communication device 10B-2 by activating the reception unit Rx(2).

The reception unit Rx(2) receives the control signal x2 from the communication device 10B-2 via the control channel 30-2 under the control by the reception control unit 170A-2. More specifically, in the case where the reception unit Rx(2) is activated by the reception control unit 170A-2, the reception unit Rx(2) starts reception of the control signal x2 from the communication device 10B-2.

Note that the reception unit Rx(2) may be similarly configured to the reception unit Rx(2) according to the second embodiment. Then, other reception units in the signal transmission system 1-2, that is, the reception unit Rx(1) and the reception units Rx(5) to Rx(8) may be similarly configured to the reception unit Rx(2).

The reception signal control unit 150A-2 controls the switch unit 110A such that the control signal x2 received by the reception unit Rx(2) connected to the control channel 30-2 is output to an output destination corresponding to the control signal x2. Then, the switch unit 110A outputs the control signal x2 to the output destination corresponding to the control signal x2 under the control by the reception signal control unit 150A-2.

Here, a case in which the communication quality of the control signal x2 transmitted through the control channel 30-2 is rapidly deteriorated is assumed, similarly to the first embodiment. In particular, in the second embodiment, in the case where the communication quality of the control signal x2 transmitted from the communication device 10B-2 through the control channel 30-2 is deteriorated, a method of seamlessly switching the transmission channel of the control signal x2 by releasing a part of the main channels 20-2 to 20-5 and using the released channel will be described.

The control signal x2 is transmitted by the transmission unit Tx(2) for control channel in the communication device 10B-2 through the control channel 30-2 (first channel) and is received by the reception unit Rx(2) for control channel in the communication device 10A-2, similarly to the first embodiment. Then, it is assumed that deterioration of the communication quality of the control signal x2 has been detected by the reception unit Rx(2) for control channel, similarly to the first embodiment.

The information provision unit 160A-2 provides the communication device 10B-2 with a control channel change request via the transmission unit Tx(1) for control channel. Note that the transmission of the control signal x2 through the control channel 30-2 may be continued after the control channel change request is provided to the communication device 10B-2. In the communication device 10B-2, the reception unit Rx(1) for control channel receives the control channel change request. Then, the information acquisition unit 130B-2 acquires the control channel change request.

In a case where the control channel change request has been acquired by the information acquisition unit 130B-2, the information provision unit 160B-2 provides the communication device 10A-2 with control channel change acceptance via the transmission unit Tx(2) for control channel. In the communication device 10A-2, the reception unit Rx(2) for control channel receives the control channel change acceptance, and the information acquisition unit 130A-2 acquires the control channel change acceptance.

In the communication device 10B-2, the transmission control unit 140B-2 releases a part of the main channels 20-2 to 20-5 in which the main stream (video signals x5 to x8) are transmitted, and uses the released channel as a control channel (second channel). However, when a part of the main channels 20-2 to 20-5 is released, a communication band used as the main channel 20 is lost by the released part. Therefore, transmission of the main stream (video signals x5 to x8) while maintaining the existing format is not possible.

Therefore, the transmission control unit 140B-2 releases a part of the main channels 20-2 to 20-5 by format change of the main stream (video signals x5 to x8) transmitted through the main channels 20-2 to 20-5 and transmission structure change of the transmission channels of the main stream based on the format change, and uses the released channel as the control channel (second channel). At this time, the transmission control unit 140B-2 may perform the format change and the transmission structure change on the basis of reception capability of the communication device 10A-2, transmission capability of the communication device 10B-2, and the main stream (video signals x5 to x8)

Here, in general, if the format change of a currently displayed video signal is performed, resynchronization is required between devices that transmit and receive the video signal, and thus a pause is given in the display of the video signal. However, the resynchronization becomes unnecessary by bandwidth reduction without changing a pixel clock (for example, 17% bandwidth reduction by converting 12-bit pixels into 10-bit pixels or the like) or pixel clock reduction (for example, reduction in a frame rate, change of a signal type to a color difference signal, or the like), and the pause in the display of the video signal can be avoided.

FIG. 7 illustrates an example in which the main channel 20-5 is assigned to a new control channel as a part of the main channels 20-2 to 20-5 by the transmission control unit 140B-2.

The transmission control unit 140B-2 provides the communication device 10A-2 with a structure change notification indicating the format change of the main stream transmitted through the main channels 20-2 to 20-5 (a new format of the main stream changed to be transmitted through the main channels 20-2 to 20-4) and the transmission structure change of the transmission channel of the main stream (change as to which main channel 20 transmits which video component) via the transmission unit Tx(2) for control channel.

Furthermore, the transmission control unit 140B-2 provides the communication device 10A-2 with identification information (channel number) of the main channel 20-5 assigned as the new control channel. Here, the case in which the identification information of the new control channel is included in the structure change notification is mainly assumed. However, the identification information of the new control channel may be separately provided from the structure change notification.

Furthermore, the timing when the notification of the identification information of the new control channel and the structure change notification are made is not particularly limited. For example, the notification of the identification information of the new control channel and the structure change notification may be repeatedly performed until an ACK signal indicating reception of the notification of the identification information of the new control channel and the structure change notification is received via the control channel 30-2 that has detected deterioration of the communication quality. For example, the notifications may be transmitted using an area (for example, a blanking section or the like) available for data transmission in the main stream (video signals x5 to x8) transmitted through the main channels 20-2 to 20-5.

In the communication device 10A-2, the information acquisition unit 130A-2 acquires the structure change notification and the identification information of the new control channel from the communication device 10B-2 via the reception unit Rx(2) for control channel. The reception control unit 170A-2 assigns the main channel 20-5 as the new control channel on the basis of the identification information of the new control channel. Then, the information provision unit 160A-2 provides the communication device 10B-2 with an assignment completion notification via the transmission unit Tx(1) for control channel. In the communication device 10B-2, the information acquisition unit 130B-2 acquires the assignment completion notification via the reception unit Rx(1) for control channel.

In the communication device 10B-2, when the information acquisition unit 130B-2 acquires the assignment completion notification via the reception unit Rx(1) for control channel, the transmission control unit 140B-2 starts transmission of the control signal x2 to the communication device 10A-2 through the new control channel 20-5 (second channel) by the transmission unit Tx(8) for new control channel. Thereby, the transmission unit Tx(8) for new control channel starts to transmit the control signal x2 to the communication device 10A-2 in parallel with transmission of the control signal x2 through the control channel 30-2.

More specifically, when the information acquisition unit 130B-2 acquires the assignment completion notification via the reception unit Rx(1) for control channel, the transmission signal control unit 120B-2 controls the switch unit 110B such that the control signal x2 is input to the transmission unit Tx(8) for new control channel connected to the new control channel 20-5 (second channel). Then, the transmission control unit 140B-2 controls the transmission unit Tx(8) such that transmission of the control signal x2 input to the transmission unit Tx(8) by the transmission unit Tx(8) is started.

Meanwhile, in the communication device 10A-2, when the information provision unit 160A-2 provides the assignment completion notification via the transmission unit Tx(1) for control channel, the reception control unit 170A-2 starts reception of the control signal x2 transmitted from the communication device 10B-2 by the reception unit Rx(8) for new control channel. Thereby, the reception unit Rx(8) for new control channel starts to receive the control signal x2 from the communication device 10B-2 in parallel with transmission of the control signal x2 through the control channel 30-2.

More specifically, when the information provision unit 160A-2 provides the assignment completion notification via the transmission unit Tx(1) for control channel, the reception control unit 170A-2 controls the reception unit Rx(8) for new control channel connected to the new control channel 20-5 such that reception of the control signal x2 by the reception unit Rx(8), transmission of which has been started, is started. The reception signal control unit 150A-2 controls the switch unit 110A such that the control signal x2 received by the reception unit Rx(8) for new control channel is output to an output destination corresponding to the control signal x2.

The reception unit Rx(8) for new control channel detects the communication quality of the control signal x2 that the reception unit Rx(8) itself receives. Then, in a case where the reception unit Rx(8) for new control channel has detected that the communication quality of the control signal x2 that the reception unit Rx(8) itself receives is better than the second threshold (second quality), the information provision unit 160A-2 provides the communication device 10B-2 with change success via the transmission unit Tx(1) for control channel.

The reception control unit 170A-2 stops reception of the control signal x2 by the reception unit Rx(2) for control channel via the control channel 30-2 in a case where a predetermined condition has been satisfied since the start of transmission of the control signal x2 by the transmission unit Tx(8) for new control channel. More specifically, the reception control unit 170B-2 may stop the operation of the reception unit Rx(2) for control channel in a case where the information provision unit 160B-2 has provided the change success via the transmission unit Tx(1) for control channel. Thereby, reduction of power consumption is expected.

In the communication device 10B-2, the transmission control unit 140B-2 stops transmission of the control signal x2 by the transmission unit Tx(2) for control channel via the control channel 30-2 in a case where a predetermined condition has been satisfied since the start of transmission of the control signal x2 by the transmission unit Tx(8) for new control channel. More specifically, the transmission control unit 140B-2 may stop the operation of the transmission unit Tx(2) for control channel in a case where the information acquisition unit 130B-2 has acquired the change success via the reception unit Rx(1) for control channel. Thereby, reduction of power consumption is expected.

Note that, in the above description, the condition that the communication quality of the control signal x2 transmitted by the communication device 10B-1 through the new control channel 20-5 and received by the communication device 10A-2 is better than the second threshold is assumed as an example of the predetermined condition. However, the predetermined condition is not limited to such a case. For example, the predetermined condition may be a condition that a predetermined time has elapsed since the start of transmission of the control signal x2 by the transmission unit Tx(8) for new control channel.

The configuration example of the communication device 10 according to the second embodiment has been described.

(2.3. Operation of Signal Transmission System)

Next, an example of an operation of the signal transmission system 1-2 according to the second embodiment will be described.

Figure 10:
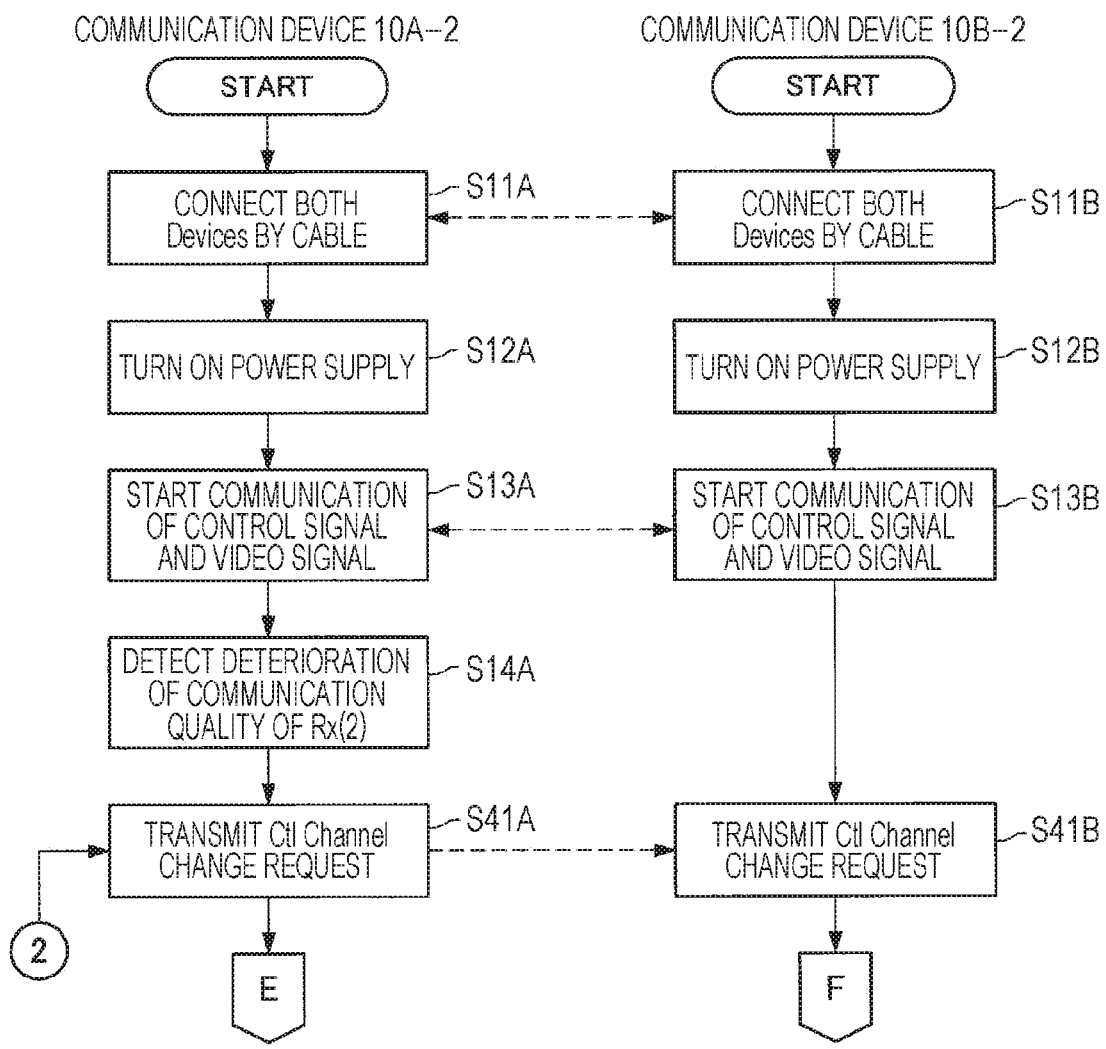
FIG. 10 is a flowchart illustrating an example of an operation of the signal transmission system according to the second embodiment.
Figure 11:
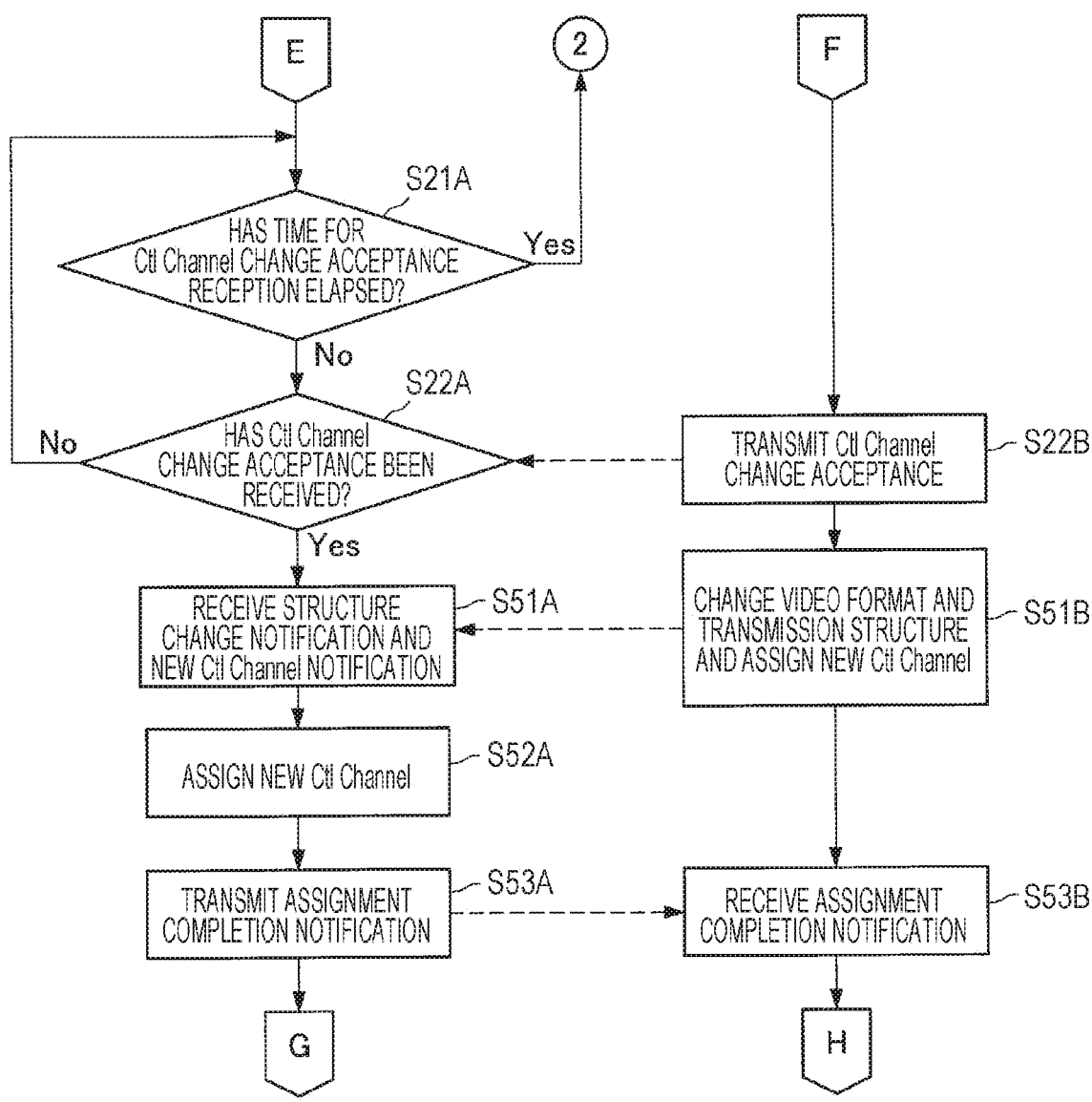
FIG. 11 is a flowchart illustrating an example of the operation of the signal transmission system according to the second embodiment.

FIGS. 10 to 12 are flowcharts illustrating examples of the operation of the signal transmission system 1-2 according to the second embodiment. First, an example of an operation of the communication device 10A-2 that provides a control channel change request will be described and then an example of an operation of the communication device 10B-2 that acquires the control channel change request will be described with reference to FIGS. 10 to 12 (and also FIGS. 7 to 9 as appropriate). First, an example of an operation of the communication device 10A-2 that provides a control channel change request will be described.

As illustrated in FIG. 10, both the devices (the communication devices 10A-2 and 10B-2) are connected by the cable 60-2 (S11A) and a power supply of the communication device 10A-2 is turned ON (S12A), the communication device 10A-2 starts communication of a control signal and a video signal with the communication device 10B-2 (S13A). Here, a case in which the reception unit Rx(2) for control channel has detected deterioration of the communication quality of the control signal x2 that the reception unit Rx(2) for control channel receives is assumed (S14A).

At this time, the transmission unit Tx(1) for control channel provides the communication device 10B-2 with the control channel change request (S41A).

As illustrated in FIG. 11, in the communication device 10A-2, in a case where the time since provision of the control channel change request has passed a standby time for receiving the control channel change acceptance ("Yes" in S21A), the operation is moved onto retransmission of the control channel change request in S41A. Meanwhile, in the communication device 10A-2, in a case where the time since provision of the control channel change request has not passed the standby time for receiving the control channel change acceptance ("No" in S21A), the operation is moved onto S22A.

Next, in a case where the reception unit Rx(2) for control channel has not received the control channel change acceptance ("No" in S22A), the operation is moved onto the determination as to whether or not the time since provision of the control channel change request in S21A has passed the standby time for receiving the control channel change acceptance. On the other hand, in a case where the reception unit Rx(2) for control channel has received the control channel change acceptance ("Yes" in S22A), the information acquisition unit 130A-2 receives the structure change notification and the notification of the identification information of the new control channel via the reception unit Rx(2) for control channel (S51A).

Next, the reception control unit 170A-2 assigns the main channel 20-5 as the new control channel on the basis of the identification information of the new control channel (S52A). Then, the transmission unit Tx(1) for control channel transmits the assignment completion notification to the communication device 10B-2 (S53A).

As illustrated in FIG. 12, when the communication device 10B-2 transmits the control signal via the new control channel 20-5 (transmits the same control signal as the control signal transmitted through the control channel 30-2), the reception unit Rx(8) for new control channel receives the control signal transmitted through the new control channel 20-5 (S61A). The reception unit Rx(8) for new control channel confirms that the control signal that the reception unit Rx(8) itself receives and the control signal received via the control channel 30-2 are the same. The determination of the identity of the control signals may be made similarly to the first embodiment.

Next, in a case where the communication quality of the control signal received by the reception unit Rx(8) for new control channel is not good (NG), that is, in a case where the communication quality being better than the second threshold (second quality) is not detected ("No" in S32A), an interruption procedure is executed (S64A). In the interruption procedure, the video format change and the transmission structure change may be undone, and the transmission of the control signal through the new control channel 20-5 may be stopped.

Meanwhile, in a case where the communication quality of the control signal that the reception unit Rx(8) for new control channel receives is good (OK), that is, in a case where the communication quality being better than the second threshold (second quality) has been detected ("Yes" in S32A), the transmission unit Tx(1) for control channel transmits the change success (S33A), and the operation of the reception unit Rx(2) for control channel is stopped (S35A). Thereby, reduction of power consumption is expected.

Next, an example of an operation of the communication device 10B-2 that acquires the control channel change request will be described with reference to FIGS. 10 to 12 (and FIGS. 7 to 9 as appropriate).

As illustrated in FIG. 10, both the devices (the communication devices 10A-2 and 10B-2) are connected by the cable 60-2 (S11B) and a power supply of the communication device 10B-2 is turned ON (S12B), the communication device 10B-2 starts communication of a control signal and a video signal with the communication device 10A-2 (S13B). Here, a case in which the reception unit Rx(2) for control channel in the communication device 10A-2 has detected deterioration of the communication quality of the control signal x2 is assumed.

At this time, the reception unit Rx(1) for control channel receives the control channel change request from the communication device 10A-2 (S41B).

As illustrated in FIG. 11, in the communication device 10B-2, the transmission unit Tx(2) for control channel transmits the control channel change acceptance (S22B). Then, the transmission control unit 140B-2 performs the format change of the main stream (video signals x5 to x8) transmitted through the main channels 20-2 to 20-5 and the transmission structure change of the transmission channels, and assigns a released control channel as a new control channel (S51B). Thereafter, the reception unit Rx(1) for control channel receives the assignment completion notification from the communication device 10A-1 (S53B).

As illustrated in FIG. 12, the transmission unit Tx(8) for new control channel transmits the control signal (transmits the same control signal as the control signal transmitted through the control channel 30-2) (S61B). In the communication device 10B-2, in a case where the time since the start of transmission of the control signal has passed a standby time for receiving change success ("Yes" in S32B), the interruption procedure is executed (S64B). In the interruption procedure, the video format change and the transmission structure change may be undone, and the transmission of the control signal through the new control channel 20-5 may be stopped.

On the other hand, in the communication device 10B-2, in a case where the time since the start of transmission of the control signal has passed the standby time for receiving the change success ("No" in S32B), the operation is moved onto S33B.

Next, in a case where the reception unit Rx(1) for control channel has not received the change success ("No" in S33B), the operation is moved onto determination as to whether or not the time since the start of transmission of the control signal in S32B has passed the standby time for receiving the change success. On the other hand, in a case where the reception unit Rx(1) for control channel has received the change success ("Yes" in S33B), the operation of the transmission unit Tx(2) for control channel is stopped (S35B). Thereby, reduction of power consumption is expected.

The operation example of the signal transmission system 1-2 according to the second embodiment has been described.

3. CONCLUSION

As described above, according to the embodiment of the present disclosure, a transmission control device is provided, which includes an information acquisition unit configured to acquire a channel change request transmitted from a reception device in a case where communication quality of a control signal transmitted through a first channel and received by the reception device being poorer than first quality has been detected, and a transmission control unit configured to start transmission of the control signal to the reception device through a second channel different from the first channel in a case where the channel change request has been acquired, in which the transmission control unit stops transmission of the control signal through the first channel in a case where a predetermined condition has been satisfied since the start of transmission of the control signal through the second channel.

According to the configuration, in a case where a main stream and a control signal are transmitted in parallel between two devices, transmission of the main stream can be continued without interruption of the transmission of the main stream even in a case where communication quality of the control signal is deteriorated.

Furthermore, according to the embodiment of the present disclosure, a reception control device is provided, which includes an information provision unit configured to provide a channel change request to a transmission device in a case where communication quality of a control signal transmitted from the transmission device through a first channel and received by a reception device being poorer than first quality has been detected, and a reception control unit configured to acquire the control signal in a case where transmission of the control signal has been started from the transmission device through a second channel different from the first channel on the basis of the channel change request and the control signal has been received by the reception device, in which transmission of the control signal through the first channel is stopped in a case where a predetermined condition has been satisfied since the start of transmission of the control signal through the second channel.

According to the configuration, in a case where a main stream and a control signal are transmitted in parallel between two devices, transmission of the main stream can be continued without interruption of the transmission of the main stream even in a case where communication quality of the control signal is deteriorated.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

For example, the functional blocks included in the communication device 10A-1 may be mounted on separate integrated circuits (ICs) or any combination of the functional blocks may be mounted on the same IC. The functional blocks included in the communication device 10A-2 may be mounted on separate ICs or any combination of the functional blocks may be mounted on the same IC. Furthermore, for example, the functional blocks included in the communication device 10B-1 may be mounted on separate ICs or any combination of the functional blocks may be mounted on the same IC. The functional blocks included in the communication device 10B-2 may be mounted on separate ICs or any combination of the functional blocks may be mounted on the same IC.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)

A transmission control device including:

an information acquisition unit configured to acquire a channel change request transmitted from a reception device in a case where communication quality of a control signal transmitted through a first channel and received by the reception device being poorer than first quality has been detected; and a transmission control unit configured to start transmission of the control signal to the reception device through a second channel different from the first channel in a case where the channel change request has been acquired, in which the transmission control unit stops transmission of the control signal through the first channel in a case where a predetermined condition has been satisfied since the start of transmission of the control signal through the second channel.

(2)

The transmission control device according to (1), in which the information acquisition unit acquires a transmission stop request transmitted from the reception device in a case where a condition that the communication quality of the control signal transmitted through the second channel and received by the reception device is better than second quality has been satisfied as the predetermined condition, and the transmission control unit stops transmission of the control signal through the first channel in a case where the transmission stop request has been acquired.

(3)

The transmission control device according to (1) or (2), in which the transmission control unit uses a redundant channel as the second channel.

(4)

The transmission control device according to according to (1) or (2), in which the transmission control unit releases a part of a plurality of channels in which content is transmitted and uses the released channel as the second channel.

(5)

The transmission control device according to (4), in which the transmission control unit releases a part of the plurality of channels by format change of the content and transmission structure change of a transmission channel of the content based on the format change and uses the released channel as the second channel.

(6)

The transmission control device according to (5), in which the transmission control unit provides the reception device with a change notification indicating the format change and the transmission structure change.

(7)

The transmission control device according to any one of (1) to (6), in which the transmission control unit provides the reception device with identification information of the second channel.

(8)

The transmission control device according to any one of (1) to (7), further including:

a transmission signal control unit configured to perform control such that the control signal is input to a transmission unit connected to the second channel in a case where the channel change request has been acquired, in which the transmission control unit controls the transmission unit such that transmission of the control signal through the second channel is started, the control signal having been input to the transmission unit, in the case where the channel change request has been acquired.

(9)

A transmission control method including:

acquiring a channel change request transmitted from a reception device in a case where communication quality of a control signal transmitted through a first channel and received by the reception device being poorer than first quality has been detected;

starting transmission of the control signal to the reception device through a second channel different from the first channel in a case where the channel change request has been acquired; and stopping, by a processor, transmission of the control signal through the first channel in a case where a predetermined condition has been satisfied since the start of transmission of the control signal through the second channel.

(10)

A reception control device including:

an information provision unit configured to provide a channel change request to a transmission device in a case where communication quality of a control signal transmitted from the transmission device through a first channel and received by a reception device being poorer than first quality has been detected; and a reception control unit configured to acquire the control signal in a case where transmission of the control signal has been started from the transmission device through a second channel different from the first channel on the basis of the channel change request and the control signal has been received by the reception device, in which transmission of the control signal through the first channel is stopped in a case where a predetermined condition has been satisfied since the start of transmission of the control signal through the second channel.

(11)

The reception control device according to (10), in which the information provision unit provides a transmission stop request to the transmission device in a case where a condition that the communication quality of the control signal transmitted through the second channel and received by the reception device is better than second quality has been satisfied as the predetermined condition, and transmission of the control signal through the first channel is stopped by the transmission device in a case where the transmission stop request has been acquired by the transmission device.

(12)

The reception control device according to (10) or (11), in which a redundant channel is used as the second channel.

(13)

The reception control device according to (10) or (11), in which a part of a plurality of channels in which content is transmitted is released and used as the second channel.

(14)

The reception control device according to (13), in which a part of the plurality of channels is released by format change of the content and transmission structure change of a transmission channel of the content based on the format change and the released channel is used as the second channel.

(15)

The reception control device according to (14), in which the reception control unit acquires a change notification according to the format change and the transmission structure change from the transmission device.

(16)

The reception control device according to any one of (10) to (15), in which the reception control unit acquires identification information of the second channel from the transmission device.

(17)

The reception control device according to any one of (10) to (16), in which the reception control unit performs control to start reception of the control signal by a reception unit connected to the second channel, transmission of the control signal having been started through the second channel, and the reception control device further including:

a reception signal control unit configured to perform control such that the control signal received by the reception unit is output to an output destination corresponding to the control signal.

(18)

A reception control method including:

providing a channel change request to a transmission device in a case where communication quality of a control signal transmitted from the transmission device through a first channel and received by a reception device being poorer than first quality has been detected;

acquiring, by a processor, the control signal in a case where transmission of the control signal has been started from the transmission device through a second channel different from the first channel on the basis of the channel change request and the control signal has been received by the reception device; and stopping transmission of the control signal through the first channel in a case where a predetermined condition has been satisfied since the start of transmission of the control signal through the second channel.

(19)

A signal transmission system including: a transmission control device and a reception control device, the transmission control device including an information acquisition unit configured to acquire a channel change request transmitted from a reception device in a case where communication quality of a control signal transmitted through a first channel and received by the reception device being poorer than first quality has been detected, and a transmission control unit configured to start transmission of the control signal to the reception device through a second channel different from the first channel in a case where the channel change request has been acquired, in which the transmission control unit stops transmission of the control signal through the first channel in a case where a predetermined condition has been satisfied since the start of transmission of the control signal through the second channel, and the reception control device including an information provision unit configured to provide the channel change request to a transmission device in a case where the communication quality of the control signal transmitted from the transmission device through the first channel and received by the reception device being poorer than the first quality has been detected, and a reception control unit configured to acquire the control signal in a case where transmission of the control signal has been started from the transmission device through the second channel on the basis of the channel change request and the control signal has been received by the reception device.

(20) The signal transmission system according to (19), in which the information acquisition unit acquires a transmission stop request transmitted from the reception device in a case where a condition that the communication quality of the control signal transmitted through the second channel and received by the reception device is better than second quality has been satisfied as the predetermined condition, and the transmission control unit stops transmission of the control signal through the first channel in a case where the transmission stop request has been acquired.

REFERENCE SIGNS LIST

1 Signal transmission system
10(10A, 10B) Communication device
110(110A, 110B) Switch unit
120(120A, 120B) Transmission signal control unit
130(130A, 130B) Information acquisition unit
140(140A, 140B) Transmission control unit
150(150A, 150B) Reception signal control unit
160(160A, 160B) Information provision unit
170(170A, 170B) Reception control unit
20 Main channel
30 Control channel
40 Redundant channel
50A-1 Transmission unit for redundant channel
50A-2 Reception unit for redundant channel
50A-3 Transmission unit for redundant channel
50B-1 Reception unit for redundant channel
50B-2 Transmission unit for redundant channel
50B-3 Reception unit for redundant channel
60 Cable
Tx Transmission unit
Rx Reception unit

The invention claimed is:

1. A transmission control device, comprising:
an information acquisition unit configured to acquire a channel change request from a reception device, wherein
the channel change request is acquired based on a communication quality of a control signal less than a first quality;
the control signal indicates additional information associated with content that is received by the reception device, and
the control signal is received by the reception device via a first channel; and
a transmission control unit configured to:
start transmission of the control signal to the reception device via a second channel different from the first channel,
wherein the control signal is transmitted via the second channel based on the channel change request; and
stop transmission of the control signal via the first channel, wherein the transmission of the control signal via the first channel is stopped based on a specific condition associated with the transmission of the control signal via the second channel.

2. The transmission control device according to claim 1, wherein
the specific condition indicates that the communication quality of the control signal transmitted via the second channel is greater than a second quality,
the information acquisition unit is further configured to acquire a transmission stop request from the reception device based on the specific condition, and
the transmission of the control signal via the first channel is stopped based on the transmission stop request.

3. The transmission control device according to claim 1, wherein the second channel corresponds to a redundant channel.

4. The transmission control device according to claim 1, wherein
the transmission control unit is further configured to release a channel of a plurality of channels associated with the content, and
the released channel corresponds to the second channel.

5. The transmission control device according to claim 4, wherein
the transmission control unit is further configured to release the channel of the plurality of channels based on:
format change of the content, and
transmission structure change of a transmission channel of the content based on the format change of the content.

6. The transmission control device according to claim 5, wherein
the transmission control unit is further configured to transmit a change notification to the reception device, and
the change notification indicates the format change of the content and the transmission structure change of the transmission channel of the content.

7. The transmission control device according to claim 1, wherein
the transmission control unit is further configured to transmit identification information of the second channel to the reception device.

8. The transmission control device according to claim 1, further comprising:
a transmission unit coupled to the second channel; and
a transmission signal control unit configured to:
input the control signal to the transmission unit based on the channel change request; and control the transmission unit to start the transmission of the control signal via the second channel.

9. A transmission control method, comprising:
acquiring a channel change request from a reception device, wherein
the channel change request is acquired based on a communication quality of a control signal less than a first quality;
the control signal indicates additional information associated with content that is received by the reception device, and
the control signal is received by the reception device via a first channel;
starting transmission of the control signal to the reception device via a second channel different from the first channel,
wherein the control signal is transmitted via the second channel based on the channel change request; and
stopping, by a processor, transmission of the control signal via the first channel, wherein the transmission of the control signal via the first channel is stopped based on a specific condition associated with the transmission of the control signal via the second channel.

10. A reception control device, comprising:
an information provision unit configured to transmit a channel change request to a transmission device based on a communication quality of a control signal less than a first quality, wherein
the control signal indicates additional information associated with content that is received by the reception control device, and
the control signal is received by the reception control device via a first channel; and
a reception control unit configured to:
receive the control signal from the transmission device via a second channel different from the first channel, wherein the control signal is received via the second channel based on the channel change request; and
stop reception of the control signal via the first channel based on a specific condition associated with the reception of the control signal via the second channel.

11. The reception control device according to claim 10, wherein
the specific condition indicates that the communication quality of the control signal received via the second channel is greater than a second quality, and
the information provision unit is further configured to:
transmit a transmission stop request to the transmission device based on the specific condition, and
the reception of the control signal via the first channel is stopped based on the transmission stop request.

12. The reception control device according to claim 10, wherein the second channel corresponds to a redundant channel.

13. The reception control device according to claim 10, wherein
a channel of a plurality of channels associated with the content is released, and
the released channel corresponds to used as the second channel.

14. The reception control device according to claim 13, wherein the channel of the plurality of channels is released based on:

format change of the content, and
transmission structure change of a transmission channel of the content based on the format change of the content.

15. The reception control device according to claim 14, further comprising an information acquisition unit configured to acquire a change notification from the transmission device;
wherein the change notification indicates the format change of the content and the transmission structure change of the transmission channel of the content.

16. The reception control device according to claim 10, further comprising an information acquisition unit configured to acquire identification information of the second channel from the transmission device.

17. The reception control device according to claim 10, further comprising:
a reception unit configured coupled to the second channel; and
a reception signal control unit, wherein
the reception control unit is further configured to control the reception unit to start the reception of the control signal via the second channel, and
the reception signal control unit is configured to output the control signal received by the reception unit to an output destination corresponding to the control signal.

18. A reception control method, comprising:
in a reception device:
receiving content from a transmission device;
receiving a control signal from the transmission device via a first channel, wherein the control signal indicates additional information associated with the content received by the reception device,
transmitting a channel change request to the transmission device based on a communication quality of the control signal less than a first quality;
receiving the control signal, from the transmission device, via a second channel different from the first channel, wherein the control signal is received via the second channel based on the channel change request; and
stopping the reception of the control signal via the first channel based on a specific condition associated with the reception of the control signal via the second channel.

19. A signal transmission system, comprising:
a transmission control device; and
a reception control device, wherein:
the transmission control device includes:
an information acquisition unit configured to acquire a channel change request from the reception control device based on a communication quality of a control signal less than a first quality, wherein
the control signal indicates additional information associated with content that is received by the reception control device, and
the control signal is received by the reception control device via a first channel; and
a transmission control unit configured to:
start transmission of the control signal to the reception control device via a second channel different from the first channel, wherein the control signal is transmitted via the second channel based on the channel change request; and stop transmission of the control signal via the first channel based on a specific condition associated with the transmission of the control signal via the second channel, and the reception control device includes:
an information provision unit configured to transmit the channel change request to the transmission control device based on the communication quality of the control signal via the first channel less than the first quality; and
a reception control unit configured to acquire the control signal from the transmission control device via the second channel based on the channel change request.

20. The signal transmission system according to claim 19, wherein
the specific condition indicates that a communication quality of the control signal transmitted via the second channel is greater than a second quality,
the information acquisition unit is further configured to acquire a transmission stop request from the reception control device based on the specific condition, and
the transmission of the control signal via the first channel is stopped based on the transmission stop request.

* * * * *